United States Patent
Holzmeister et al.

(10) Patent No.: US 12,409,435 B2
(45) Date of Patent: Sep. 9, 2025

(54) DETERMINING OPERATING CONDITIONS IN CHEMICAL PRODUCTION PLANTS

(71) Applicant: BASF SE, Ludwigshafen am Rhein (DE)

(72) Inventors: Phil Jack Holzmeister, Ludwigshafen am Rhein (DE); Florina Corina Patcas, Ludwigshafen am Rhein (DE); Christoph Mueller, Ludwigshafen am Rhein (DE); Maik Friedel, Ludwigshafen am Rhein (DE); Corinna Maria Spangler, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 946 days.

(21) Appl. No.: 17/430,960

(22) PCT Filed: Feb. 7, 2020

(86) PCT No.: PCT/EP2020/053148
§ 371 (c)(1),
(2) Date: Aug. 13, 2021

(87) PCT Pub. No.: WO2020/165045
PCT Pub. Date: Aug. 20, 2020

(65) Prior Publication Data
US 2022/0143569 A1    May 12, 2022

(30) Foreign Application Priority Data
Feb. 15, 2019 (EP) .................................. 19157515

(51) Int. Cl.
*B01J 19/00* (2006.01)
*G05B 19/418* (2006.01)

(52) U.S. Cl.
CPC .... *B01J 19/0033* (2013.01); *G05B 19/41885* (2013.01); *B01J 2219/00229* (2013.01);
(Continued)

(58) Field of Classification Search
CPC .... B01J 19/00; B01J 19/0006; B01J 19/0033; B01J 2219/00; B01J 2219/00049;
(Continued)

(56) References Cited

U.S. PATENT DOCUMENTS

| 2010/0230324 A1 | 9/2010 | Al-Alloush et al. |
| 2014/0283589 A1 | 9/2014 | Makki et al. |

FOREIGN PATENT DOCUMENTS

| CN | 1510018 A | 7/2004 | |
| EP | 2009520 A1 * | 12/2008 | ........... C07C 51/313 |
| WO | 2018/035718 A1 | 3/2018 | |

OTHER PUBLICATIONS

Clough, et al., "Mathematical modeling and optimization of the dehydrogenation of ethylbenzene to form styrene", Aiche Journal, vol. 22, Issue 6, Nov. 1976, pp. 1097-1105.

(Continued)

*Primary Examiner* — Natasha E Young
(74) *Attorney, Agent, or Firm* — Faegre Drinker Biddle & Reath LLP

(57) ABSTRACT

Systems and methods for determining an operating condition of a chemical production plant including at least one catalytic reactor are provided. Via a communication interface operating data and a catalyst age indicator are received (10). At least one target operating parameter for the operating condition of a scheduled production run or a current production run are determined (14). The at least one target operating parameter for the operating condition may be used for monitoring and/or controlling the chemical production plant.

21 Claims, 4 Drawing Sheets

(52) U.S. Cl.
CPC ............... *B01J 2219/00243* (2013.01); *G05B 2219/32287* (2013.01)

(58) Field of Classification Search
CPC .... B01J 2219/00191; B01J 2219/00222; B01J 2219/00227; B01J 2219/00229; B01J 2219/00243; G05B 13/00; G05B 13/02; G05B 13/0265; G05B 19/00; G05B 19/02; G05B 19/418; G05B 19/41885; G05B 2219/00; G05B 2219/30; G05B 2219/32; G05B 2219/32287
See application file for complete search history.

(56) References Cited

OTHER PUBLICATIONS

European Search Report for EP Patent Application No. 19157515.8, Issued on Aug. 12, 2019, 3 pages.
Gujarathi, et al., "Multi-objective optimization of industrial styrene reactor: Adiabatic and pseudo-isothermal operation", Chemical Engineering Science, vol. 65, Issue 6, Mar. 15, 2010, pp. 2009-2026.
International Search Report and Written Opinion received for PCT Patent Application No. PCT/EP2020/053148, mailed on May 8, 2020, 10 pages.
Lim et al., "Modeling and Optimization of a Styrene Monomer Reactor System Using a Hybrid Neural Network Model", Industrial & Engineering Chemistry Research, vol. 43, No. 20, Sep. 1, 2004, pp. 6441-6445.
Nicholson, et al., "VARX-L: Structured Regularization for Large Vector Autoregressions with Exogenous Variables", Arxiv.org, Aug. 29, 2015, 51 pages.
Shahhosseini, et al., "Optimization of Styrene Reactor Using Tabu Search and Genetic Algorithm Methods", International Journal of Chemical Reactor Engineering, vol. 9, Issue 1, Article No. A64, 2011, pp. 1-27.
Tamsilian, et al., "Modeling and sensitivity analysis of styrene monomer production process and investigation of catalyst behavior", Computers & Chemical Engineering, vol. 40, May 11, 2012, pp. 1-11.
Wu, et al., "Real-Time Prediction of Styrene Production vol. Based on Machine Learning Algorithms", Advances in Data Mining, Applications and Theoretical Aspects, ICDM 2017, Lecture Notes in Computer Science, ed. P. Perner, vol. 10357, 2017, pp. 301-312.

\* cited by examiner

DETERMINING OPERATING CONDITIONS IN CHEMICAL PRODUCTION PLANTS

CROSS-REFERENCE TO RELATED APPLICATIONS

This application is a national stage application (under 35 U.S.C. § 371) of PCT/EP2020/053148, now WO 2020/165045, filed February 7, which claims benefit of European Application No. 19157515.8, filed Feb. 15, 2019, both of which are incorporated herein by reference in their entirety.

The present disclosure relates to systems, methods and computer program products for determining operating conditions in a scheduled or in a current production run of a chemical production plant including at least one catalytic reactor.

BACKGROUND

Catalytic reactors are widely used in the chemical industry to convert raw materials to valuable chemicals. The performance of the catalyst—like conversion, selectivity and yield—is connected to the operation parameters of the reactor and the age of the catalyst. To achieve certain performance targets, the plant operators have to adjust the reactor parameters according to experience and engineering knowledge. Often, reactor models based on kinetics, heat and mass transfer phenomena are used to describe the performance of the catalyst and enable a more directed control of the reactor operation. However, such models are complex, and the experimental determination of kinetic and transport parameters is quite tedious and expensive.

More recently, models of hybrid type were published, which rely partially on process knowledge, but also use machine learning methods. For instance, Clough and Ramirez (AlChEJ 22, 1976, p. 1097) and Gujarati and Babu (Chem.Eng.Sci. 65, 2010, p. 2009) published knowledge-based models for styrene reactors and used it to optimize the reactor operation for maximizing the styrene yield or the process economics. In both cases, the kinetic rate equations and coefficients were taken from previous literature. The models are of limited practical utility, considering that the kinetic coefficients should be individually calculated for each actual catalyst (different catalysts have different reaction rates for all chemical transformations occurring in the system). Moreover, no catalyst aging rate was taken into consideration.

Tamsiian et al. (Comp. Chem. 40, 2012, p. 1) developed a model based on kinetic equations disclosed in the literature and fitted the rate coefficients by using styrene plant data from 5 days of operation.

H. Lim et al. (Ind. Eng. Chem. Res. 43, 2004, p. 6441) developed a hybrid model consisting of a first-principle (knowledge based) part to describe the dependence of the catalyst performance (conversion and selectivities) on the reactor operation parameters pressure, temperature, STO ratio and ethylbenzene flow rate as input variables; and a neural network model to predict a deactivation factor to be used in the first-principle model. The neural network predicts an updated deactivation factor based on the deactivation factor, inlet temperature, total pressure and partial pressures of ethylbenzene and steam of the latest time step.

Shahhosseini et al. (Int. J. Chem. React. Eng. 9, 2011) developed a hybrid model to optimize the performance of an adiabatic industrial reactor system. First, they fitted a kinetic model using 7 data points measured in an experimental isothermic reactor. With the kinetic coefficients thus estimated, they used a Tabu search algorithm or a genetic algorithm to efficiently optimize the operating conditions for maximizing two objective functions, the ethylbenzene conversion and the styrene selectivity. Catalytic activity was modeled as an exponential function of time, decaying from 100% to 40% over 48 months, based on literature values. The modeling of deactivation in this fashion cannot reflect the effects of different operating scenarios, which is mandatory for a run- and plant-specific prediction of deactivation.

Wu et al. (Lecture Notes in Computer Science, 10357, pp. 301-312, 2017) and WO 2018/035718 A1 disclose a data-driven model for real-time prediction of styrene production volume based on real operating data. 33 sensor-based predictors were identified from a combination of Principal Component Analysis (PCA) and Random Forest variable importance analysis. Three models, a Generalized Regression Neural Network (GRNN), a GRNN after Kalman-filtering and a Random Forest Regression Model, were compared for predicting the yield of styrene monomers. Wu et al focus on predicting the current styrene production based on available sensor data, with the stated motivation that this information is usually only available after analytical testing, which can take several hours. The presented methods however do not relate to making performance prediction based on user-defined operating scenarios or forecasting of the performance, including the styrene monomer yield, at future points in time. No deactivation of the catalyst is considered.

Thus, a number of knowledge-based or kinetic models have been developed for modeling styrene production in catalytic reactors and more recently, elements of machine learning (ML) have been integrated (hybrid models), though in several cases for optimization of the kinetic model rather than the performance modeling itself. In all hybrid modeling and machine learning approaches, the ML methods are trained on small datasets, typically consisting of a single run of a single experimental or production plant.

Knowledge-based or kinetic, hybrid reactor models are complex and often necessitate simplifying assumptions in order to reduce the computing effort. In most cases, not all of the physico-chemical processes which contribute to the performance and aging of a catalyst are understood. For instance, in the case of the styrene catalyst, the potassium loss is controlled by the temperature gradients occurring along the catalyst bed depth and within the catalyst particles, as well as the STO ratio, the carbon dioxide content in the gaseous mixture (resulting from coke gasification), as well as the pressure gradient along the bed, making an exact estimation of the potassium evaporation rate impossible. One cannot calculate a priori the potassium loss rate at every point of the reactor bed in order to estimate the aging rate of the catalyst within the catalyst bed and over the lifetime of the catalyst.

An object of the present disclosure is to provide a method for determining operating conditions in a chemical production plant including at least one catalytic reactor, which allows for robust, stable and reliable reactor operation and enhances process control in catalyst-based production plants.

SUMMARY

According to a first aspect of the invention, a system for determining an operating condition of a chemical production plant including at least one catalytic reactor is provided. The system comprises:

a communication interface and a processing device in communication with the communication interface, the system configured to:

receive, via the communication interface, operating data indicative of a pre-defined operating condition for the scheduled production run, or measured operating data indicative of a current operating condition for the current production run, wherein at least one operating data point includes a desired operating value indicative of the change in the current operating condition, receive, via the communication interface, a catalyst age indicator associated with a period of time the catalyst has been used in the current or scheduled production run, determine, via the processing device, at least one target operating parameter for the operating condition of the scheduled production run or the change in the current production run based on the operating data and the catalyst age indicator using a data-driven model, preferably a data-driven machine learning model, wherein the data-driven model is parameterized according to a training dataset, wherein the training dataset is based on sets of historical data comprising operating data, catalyst age indicator, and the at least one target operating parameter, provide, via the communication interface, the at least one target operating parameter for the operating condition of the scheduled or the change in the current production run.

According to another example of the first aspect of the invention, a system for determining an operating condition of a chemical production plant including at least one catalytic reactor is provided. The system comprises a communication interface and a processing device in communication with the communication interface.

(a) for a scheduled production run, the system is configured to:

receive, via the communication interface, operating data indicative of a pre-defined operating condition for the scheduled production run, receive, via the communication interface, a catalyst age indicator associated with a period of time the catalyst has been used in the scheduled production run, determine, via the processing device, at least one target operating parameter for the operating condition of the scheduled production run based on the operating data and the catalyst age indicator using a data-driven model, wherein the data-driven model is parameterized according to a training dataset, wherein the training dataset is based on sets of historical data comprising operating data, catalyst age indicator, and the at least one target operating parameter, provide, via the communication interface, the at least one target operating parameter for the operating condition of the scheduled production run, or (b) for a change in a current production run, the system is configured to:

receive, via the communication interface, measured operating data indicative of a current operating condition for the current production run, wherein at least one operating data point includes a desired operating value indicative of the change in the current operating condition, receive, via the communication interface, a catalyst age indicator associated with a period of time the catalyst has been used in the current production run, determine, via the processing device, at least one target operating parameter for the operating condition of the change in the current production run based on the operating data and the catalyst age indicator using a data-driven model, wherein the data-driven model is parameterized according to a training dataset, wherein the training dataset is based on sets of historical data comprising operating data, catalyst age indicator, and the at least one target operating parameter, provide, via the communication interface, the at least one target operating parameter for the operating condition of the change in the current production run.

According to a second aspect of the invention, a system for optimizing an operating condition of a scheduled production run or of a change in a current production run of a chemical production plant is provided. The system comprises the system outlined above and an optimization processing device, the optimization processing device configured to:

receive, via the communication interface, for more than one operating condition of the scheduled production run or of the change in the current production run, the determined target operating parameter(s), determine, via the optimization processing device, based on the received target operating parameter(s) for each operating condition a minimum or maximum value of the target operating parameter(s) or a minimum or maximum value of at least one optimization parameter derived from the target operating parameter(s), provide, via the communication interface, the minimum or maximum value indicative of an optimal operating condition of the scheduled production run or the current production run e.g. the minimum or maximum value of the target operating parameter(s) or the minimum or maximum value of the optimization parameter derived from the target operating parameter(s).

According to another example of the second aspect of the invention, a system for optimizing an operating condition of a chemical production plant is provided. The system comprises the system outlined above and an optimization processing device, the optimization processing device configured to:

receive, via the communication interface, for more than one operating condition as determined either (a) for scheduled production runs or (b) for changes in a current production run, the determined target operating parameter(s), determine, via the optimization processing device, based on the received target operating parameter(s) for each operating condition a minimum or maximum value of the target operating parameter(s) or a minimum or maximum value of an optimization parameter derived from the target operating parameter(s), provide, via the communication interface, the minimum or maximum value indicative of an optimal operating condition in either (a) the scheduled production run or (b) the current production run, e.g. the minimum or maximum value of the target operating parameter(s) or a minimum or maximum value of the optimization parameter derived from the target operating parameter(s).

According to a third aspect of the invention, a production monitoring and/or control system is provided that includes a communication interface communicatively coupled, e.g. via wired or wireless connection, to the system for determining the operating condition as lined out above or to the system for optimizing the operating condition as lined out above. The production monitoring and/or control system may include a display device, which is configured to receive, and display determined operating condition(s). The production monitoring and/or control system may include a control unit, which is configured to receive determined operating condition(s) to control a current or scheduled production run in the chemical production plant based on the determined operating condition(s). The determined operating condition(s) preferably include(s) determined target operating parameter(s) and optionally operating data further optionally including desired operating value(s).

According to a fourth aspect of the invention, a computer-implemented method for determining an operating condition for a scheduled production run or for a change in a current production run of a chemical production plant including at least one catalytic reactor is provided. The method comprises the steps:

receiving, via the communication interface, operating data indicative of a pre-defined operating condition of the scheduled production run, or measured operating data indicative of the current operating condition, wherein at least one operating data point includes a desired operating value indicative of the change in the current operating condition,
  receiving, via the communication interface, a catalyst age indicator associated with a period of time the catalyst has been used in the current or scheduled production run,
  determining, via the processing device, at least one target operating parameter for the operating condition of the scheduled or the change in the current production run based on the operating data and the catalyst age indicator using a data-driven machine learning model, wherein the data-driven model is parameterized according to a training dataset, wherein the training dataset is based on sets of historical data comprising operating data, catalyst age indicator, and the at least one target operating parameter,
  providing, via the communication interface, the at least one target operating parameter for the operating condition of the scheduled or the change in the current production run.

According to another example of the fourth aspect of the invention, a computer-implemented method for determining an operating condition of a chemical production plant including at least one catalytic reactor is provided. The method comprising the steps:

(a) for a scheduled production run, the method comprising the steps:
  receive, via the communication interface, operating data indicative of a pre-defined operating condition for the scheduled production run,
  receive, via the communication interface, a catalyst age indicator associated with a period of time the catalyst has been used in the scheduled production run,
  determine, via the processing device, at least one target operating parameter for the operating condition of the scheduled production run based on the operating data and the catalyst age indicator using a data-driven model, wherein the data-driven model is parameterized according to a training dataset, wherein the training dataset is based on sets of historical data comprising operating data, catalyst age indicator, and the at least one target operating parameter,
  provide, via the communication interface, the at least one target operating parameter for the operating condition of the scheduled production run, or (b) for a change in a current production run, the method comprising the steps:
  receive, via the communication interface, measured operating data indicative of a current operating condition for the current production run, wherein at least one operating data point includes a desired operating value indicative of the change in the current operating condition,
  receive, via the communication interface, a catalyst age indicator associated with a period of time the catalyst has been used in the current production run,
  determine, via the processing device, at least one target operating parameter for the operating condition of the change in the current production run based on the operating data and the catalyst age indicator using a data-driven model, wherein the data-driven model is parameterized according to a training dataset, wherein the training dataset is based on sets of historical data comprising operating data, catalyst age indicator, and the at least one target operating parameter,
  provide, via the communication interface, the at least one target operating parameter for the operating condition of the change in the current production run.

According to a fifth aspect of the invention, a method for optimizing an operating condition of a scheduled production run or of a change in a current production run of a chemical production plant is provided. The method comprises the steps of:

receive, via the communication interface, for more than one operating condition of the scheduled production run or of the change in the current production run, the determined target operating parameter(s),
  determine, via the optimization processing unit, based on the received target operating parameter(s) for each operating condition a minimum or maximum value of the target operating parameter(s) or a minimum or maximum value of an optimization parameter derived from the target operating parameter(s),
  provide, via the communication interface, the minimum or maximum value indicative of an optimal operating condition of the scheduled production run or the current production run e.g. the minimum or maximum value of the target operating parameter(s) or the minimum or maximum value of the optimization parameter derived from the target operating parameter(s).

According to another example of the fifth aspect of the invention, a method for optimizing an operating condition of a scheduled production run or of a change in a current production run of a chemical production plant, the method comprising the steps of:

receive, via the communication interface, for more than one operating condition as determined either (a) for scheduled production runs or (b) for changes in a current production run, the determined target operating parameter(s),
  determine, via the optimization processing device, based on the received target operating parameter(s) for each operating condition a minimum or maximum value of the target operating parameter(s) or a minimum or maximum value of an optimization parameter derived from the target operating parameter(s), provide, via the communication interface, the minimum or maximum value indicative of an optimal operating condition in either (a) the scheduled production run or (b) the current production run, e.g. the minimum or maximum value of the target operating parameter(s) or a minimum or maximum value of the optimization parameter derived from the target operating parameter(s).

According to a sixth aspect of the invention, a method for monitoring and/or controlling a chemical production plant is provided, which includes the steps of performing the method for determining or optimizing an operating condition as lined out above. The method may further include displaying determined operating condition(s) on a display device and/or controlling a current or scheduled production run in the chemical production plant based on the determined operating condition(s). The determined operating condition(s) preferably include determined target operating parameter(s) and/or operating data optionally including desired operating value(s).

According to a seventh aspect of the invention, a method for training a data-driven model for determining an operating condition for a scheduled production run or for a change in a current production run of a chemical production plant including at least one catalytic reactor is provided. The method comprises the steps:

receiving, via a communication interface, a training dataset based on sets of historical data comprising operating data, catalyst age indicator, the at least one target operating parameter, optionally plant metadata, training, via a processing device, the data-driven model by adjusting the parameterization according to the training dataset, providing, via a communication interface, a trained data-driven model.

According to an eights aspect of the invention, a computer program or a computer program product or computer readable non-volatile storage medium comprising computer readable instructions, which when loaded and executed by a processing device perform the methods disclosed herein.

According to a ninth aspect of the invention, a catalyst including a catalyst type identifier associated with a data-driven model trained according to the methods lined out herein is provided, wherein the model is trained for the catalyst type indicated by the catalyst type identifier. In other words, a catalyst system including a catalyst and a catalyst type identifier associated with a data-driven model trained according to the methods lined out herein is provided, wherein the model is trained for the catalyst type indicated by the catalyst type identifier.

According to a tenth aspect of the invention, a catalyst including a catalyst type identifier associated with the computer programs lined out herein is provided. In other words, a catalyst system including catalyst and a catalyst type identifier associated with the computer programs lined out herein is provided.

According to a eleventh aspect of invention, a chemical process using a catalyst associates with a data-driven model trained according to the methods lined out herein is provided, wherein the data-driven model is used to design the plant components and to optimize the operation of the chemical process for achieving target performances, in particular to an operating condition of a chemical production plant including at least one catalytic reactor.

The following disclosure applies to the systems, methods, computer programs, computer readable non-volatile storage media, catalysts, chemical processes and computer program products disclosed herein alike. Therefore, no differentiation is made between systems, methods, computer programs, computer readable non-volatile storage media or computer program products. All features are disclosed in connection with the systems, methods, computer programs, computer readable non-volatile storage media, catalysts, chemical processes and computer program products disclosed herein.

The present invention provides systems or methods for determining operating conditions or operating parameters based on a merely data-driven model, which allows for more robust, stable and reliable reactor operation and enhances process control in catalyst-based production plants. In particular, the determination is more accurate than known approaches based on kinetic models or hybrid models, since no a priori information on the reaction kinetics and hence no estimations or simplifying assumptions regarding the underlying processes are required.

Specifically, the determination takes account of the catalyst deactivation by providing the catalyst age indicator associated with a period of time the catalyst has been used in the current production run. Including the catalyst age indicator as model input parameter allows for more accurate determination of operating conditions, since the model inherently takes account of catalyst deactivation or ageing. With the catalyst deactivation considered the determination of operating parameters is applicable to a wide range of chemical production plants and operating parameters. In contrast data-driven models not taking catalyst aging into account are only narrowly applicable. In particular such models are restricted to the chemical production plant the model was trained for, sometimes even only a single run in the production plant and a narrow range of operating conditions.

The systems and methods of the present disclosure perform short-term discrete prediction as well as time-series forecasting. In the latter case they are able to cover the full deactivation process of the catalyst during a whole production run. The methods and systems enable the plant operator to improve and optimize operation policies on a day-to-day basis according to the energy costs, market supply of the raw material or need for the plant product, and other limitations which may occur in the plant, like outages of different plant parts or utilities.

Moreover, the systems and methods allow for predicting short-term and/or forecasting long-term behavior of a catalyst-based production plant using operating data of the plant and the catalyst age indicator. This allows for enhanced process control in catalyst-based production plants, since e.g. plant operators can easily assess scheduled or current runs based on the operating conditions present in the production plant. As such the system provides a powerful tool for planning, monitoring and controlling the production process.

In one embodiment of the present invention the chemical production plant comprises one or more catalytic reactor(s). In the context of the present invention the term "catalytic reactor" shall mean a chemical reactor in which a catalyzed chemical reaction takes place and which generally contains a catalyst. The catalytic reactor may be a fixed bed catalytic reactor. The chemical production plant may be a styrene production plant.

In this context, a data-driven model, preferably data-driven machine learning model or a merely data-driven model, refers to a trained mathematical model that is parametrized according to a training data set to reflect reaction kinetics or physico-chemical processes of the chemical production plant or the catalytic reactor. An untrained mathematical model refers to a model that does not reflect reaction kinetics or physico-chemical processes, e.g. the untrained mathematical model is not derived from physical law providing a scientific generalization based upon empirical observation. Hence, the kinetic or physico-chemical properties may not be inherent to the untrained mathematical model. The untrained model does not reflect such properties. Feature engineering and training with respective training data sets enable parametrization of the untrained mathematical model. The result of such training is a merely data-driven model, preferably data-driven machine learning model, which as a result of the training process, preferably solely as a result of the training process, reflects reaction kinetics or physico-chemical properties.

Historical data in this context refers to data sets including at least operating data, catalyst age indicator, and the at least one target operating parameter, wherein each data set is associated with a single production run. Hence each data set includes data associated with the production run from production start to production end for one catalyst. Such data may be measured and recorded during the production run over the catalyst's lifetime, e.g. from production start after catalyst exchange to the production end, when the catalyst requires exchange again.

The chemical reaction catalyzed is not restricting the scope of this invention. As an example, the catalyst may be a dehydrogenation catalyst. Particularly, the catalyst of the catalytic reactor may be an iron oxide-based catalyst for the dehydrogenation of aliphatic or alkylaromatic hydrocarbons to form the corresponding unsaturated hydrocarbons. Examples of such dehydrogenation processes are the dehydrogenation of ethylbenzene to styrene, of isopropylbenzene to alpha-methylstyrene, of butene to butadiene or of isoamylene to isoprene. The methods and systems are particularly useful in styrene production plants. Preferably the chemical production plant is a styrene production plant converting ethylbenzene to styrene using a styrene catalyst. The preparation of styrene typically includes heterogeneously catalyzed dehydrogenation of ethylbenzene in the presence of steam. The catalytic dehydrogenation of aliphatic or alkylaromatic hydrocarbons is usually carried out industrially in the presence of steam at temperatures in the range from 500 to 700° C. In these processes, the hydrocarbon and the steam are typically mixed and passed over the iron oxide dehydrogenation catalyst at elevated temperatures and low pressures.

The term operating data refers to a quantity indicative of the operation status of the chemical production plant. In particular such quantities relate to measurement data collected during the production run of the chemical production plant and may be directly or indirectly derived from such measurement data. In a preferred embodiment the operating data includes sensor data measured through sensors installed in the chemical production plant, quantities directly or indirectly derived from such sensor data, analytical data measured in samples taken from the chemical production plant, quantities directly or indirectly derived from such analytical data or combinations thereof.

Sensor data may include measured quantities available in chemical production plants by means of installed sensors, e.g. temperature sensors, pressure sensors, flow rate sensors, etc. Analytical data may include quantities provided from analytics measurements of samples extracted at any point in the process or in time from the chemical production plant. In particular, such analytical data may include a composition of a reactant, starting material, a product and/or a side product as determined e.g. via gas chromatography from samples extracted during the production process at different stages of the production process, e.g. before or after catalytical reactor(s). Analytical data preferably forms the basis for determining catalyst performance characteristics.

The set of operating data may include raw data, which refers to basic, non-processed analytical and/or sensor data, or processed or derived parameters, which are directly or indirectly derived from raw data. In case of a chemical production plant derived parameters may include averaged inlet temperature over multiple catalytic reactors derived from the respective temperature sensors; steam-to-oil ratio derived from the raw data of a steam flow rate and a reactant flow rate; conversion and selectivity derived from the analytical data before and after the reactor(s); any type of normalized data, e.g. production values normalized by catalyst volume or catalyst mass; any data derived from the time-series data, e.g. cumulative production amount, maximum load to date, or any combination thereof.

Particularly for chemical production plants conversion, selectivity and yield may be derived from analytical data. Here conversion refers to the fraction, preferably the percentage of reactant converted totally in the reactor. In case of e.g. styrene production this corresponds to the conversion of the starting material ethylbenzene into any product. Selectivity of the desired product refers to the amount of converted reactant which is transformed into a desired product. In case of e.g. styrene production this corresponds to the selectivity of the reaction ethylbenzene-to-styrene. Yield of a desired product refers to the mathematical product of conversion and the product specific selectivity. Yield may be represented by the percentage of reactant entered into the reactor, which is converted to desired product. In a further embodiment plant metadata indicative of a physical plant layout is received via the communication interface. Plant metadata may include plant-specific quantities that describe e.g. the properties of the reactor(s), which are pre-defined by the physical plant layout and may be relevant to the plant or reactor performance. Plant metadata for instance includes a number of reactors the reactant mixture subsequently passes through, e.g. 2 or 3 reactors, a total catalyst volume, a catalyst volume by reactor, dimensions (length, diameter, height . . . ) of each reactor, catalyst type used in the plant or combinations thereof. In a further embodiment the determination, via the processing unit, of the at least one target operating parameter is additionally based on the plant metadata using the data-driven model, wherein the training dataset is based on sets of historical data additionally comprising plant meta data. Including plant metadata into the determination of operating conditions allows to build a data-driven model applicable to different plants, which in turn increases the number of data points available to train the data-driven model. As a result, the data-driven model broadly captures operating conditions of different plants running under different operating conditions with different physical plant layouts allowing for more accurate determination.

In a further embodiment the sets of historical data include data from multiple production runs, multiple plants and/or multiple catalyst batches of the same type of catalyst. Including multiple production runs into the training allows to cover different operating conditions of the same or different plant(s). Including data from multiple catalyst batches allows to take account of differences between catalyst batches. Data from multiple catalyst batches may include data from multiple production runs, wherein for at least one of the productions runs a different production batch of the same type of catalyst was used. By including multiple plants data from one or more production runs from different plants may be included. Thus, operating conditions in different plants may be covered providing a broader applicability of the model. In this context the same type of catalyst refers to the same type of catalyst formulation. Multiple catalyst batches include catalysts of the same type provided from different manufacturing batches or different delivery date.

In a further embodiment the catalyst age indicator is based on a time point, a time period, a quantity derived from time dependent operating data and/or a quantity cumulatively derived from time dependent operating data. The catalyst age indicator may be specified by the time spent by the catalyst in the reactor at reaction conditions since its first contact with the reactant mixture. Additionally or alternatively, the cumulative load or the cumulative production volume of the catalyst may be used as catalyst age indicator, which is preferably defined by the total amount of reactant feed or converted reactant since the start of the run up to a prediction start point in time. Apart from the indicators mentioned here any other quantity that can serve as an indicator for the catalyst age may be utilized. The catalyst age indicator may be provided via a client device, where the plant operator enters the time of production run start or the period since production run start up to the prediction start point in time. Alternatively or additionally, the catalyst age indicator may be determined based on a time series of operating data preferably since production run start, wherein the production run start may be determined based on an operation profile in the operating data. Such operation profile may include certain temperature, pressure, flow rate profile(s) or combinations of such profile(s).

The operating condition for the scheduled or the change in the current production refer to an operating condition under which the chemical production plant may run in the future or after the prediction start point in time. Such an operating condition may include one or more operating condition(s) for a discrete point in time, for multiple discrete points in time, a period of time or several time intervals. In the latter case an operating condition may include different time intervals, for which at least one pre-defined or desired operating value takes different values in different intervals. Multiple discrete points in time, the period of time or the time intervals may extend from the prediction start point in time over the remaining production run up to production run end, at which point the catalyst needs exchanged.

The operating condition for the scheduled production run may refer to operating data of a pre-defined operating condition of the chemical production plant prior to production run start. The pre-defined operating condition may include a set of pre-defined operating data specifying the operating condition. Determining the operating condition for scheduled production runs is particularly useful for production design and planning prior to production run start. The operating condition for a current production run may refer to a change in operating conditions as currently set in the chemical production plant. The operating condition may include a set of operating data specifying the current operating conditions, wherein the operating data are in at least one operating data point different to the operating parameters as currently set in the chemical production plant. Determining the operating condition for current production runs is particularly useful for monitoring and controlling production during the current production run.

Determining the operating condition includes predicting or forecasting the catalyst or reactor performance/behavior and is used in a general manner to describe the application of the data-driven model for a set of appropriate input parameters. In the example of a styrene production plant, the determination for instance refers to the determination of the reactor inlet temperature and associated selectivity of the ethylbenzene-to-styrene reaction, given a specific operating condition via the operating data. Such a selection of output parameters of the model may be driven by the fact that most plants are running in a way that the operators adjust inlet temperatures to achieve a certain desired conversion. However, given the same dataset, a model may be developed in analogous fashion as further detailed below, having different assignments of inputs and outputs, e.g. using the reactor temperature as input to predict the conversion that is to be expected under the operating condition.

In one embodiment the determination of at least one target operating parameter for the operating condition is based on a short-term model determining target operating parameters for discrete points in time or a long-term model determining target operating parameters for a period of time particularly in the future. In case of a short-term model the at least one target operating parameter for the operating condition is determined based on a short time frame. Here a short time frame may refer to a discrete or single point in time. The short-term model may be based on different machine learning techniques including e.g. regression models, such as linear regression models, non-linear regression models, Bayesian linear regression, random forest models, neural networks or a combination thereof. Other approaches may also be applied. Preferably the short-term model does not have an intrinsic time dependency. Further preferred the short-term model predicts the performance or operating condition at time t based on the model input at that same time t.

In case of the scheduled production run, the operating data may specify the pre-defined operating condition. The catalyst age indicator may be estimated for the scheduled production run e.g. under the assumption of a pre-defined operating condition constant over time or pre-defined changes over time or based on a preceding production run. The determination via the short-term model may for instance be applied to more than one discrete point in time for a pre-defined operating condition remaining constant over the total production run and the catalyst age indicator may be estimated for each of the discrete points in time. Such an implementation is particularly advantageous for designing and planning future production runs.

In case of the current production run, the operating data may specify the operating condition as currently set in the chemical production with at least one desired operating value indicative of a change in or deviation from current operating condition. The determination via the short-term model may for instance be applied to one or more than one discrete point(s) in time for determining the effect of the at least one desired operating value indicative of a deviation from operating conditions as currently set in the chemical production. Such an implementation is particularly advantageous for monitoring and controlling current production runs.

In case of a long-term model the at least one target operating parameter for the operating condition is determined based on a long time frame. Here a long time frame may refer to multiple points in time in the future. The number of points and hence the forecasting horizon depends on the time scale of the time dynamics in the production plant. For catalyst-based production processes such dynamics may be determined by the catalyst aging dynamics and their time horizon. For a heterogenous catalyst reaction like the styrene production such a time scale may He in the range of weeks, months or years. The long-term model may be based on a time series forecasting method. Such methods for instance include known regression methods, such as autoregression models, in particular Autoregression (AR), Moving Average (MA), Autoregressive Moving Average (ARMA), Autoregressive Integrated Moving Average (ARIMA), Vector Autoregression (VAR), Vector Autoregression Moving-Average (VARMA), Vector Autoregression Moving-Average with Exogenous Regressors (VARMAX), random forest models, neural networks, convolutional neural networks, recurrent neural networks or a combination thereof. Other approaches may also be applied.

In one embodiment a time series of the at least one target operating parameter as measured, predicted or derived during the current or a previous production run up to a prediction start point in time is received via the communication interface. E.g. in case of a scheduled run target operating parameter as measured, predicted or derived during a previous production may be used. Preferably at least one target operating parameter is determined for one or more points in time following the prediction start point in time based on the operating data optionally including the desired operating value, the time series of the at least one target operating parameter, the catalyst age indicator and optionally the plant meta data using the data-driven model. Further preferred the data-driven model includes an intrinsic time-dependence. In this embodiment the at least one target operating parameter may include uncontrolled or endogenous parameters, which are not controllable in the chemical production plant via machine settings. In contrast the operating data including at least one desired operating value may include controlled or exogeneous parameters, which are controllable in the chemical production plant via machine settings. The determination of target operating parameters at a prediction start time t may include the determination e.g. for times t, . . . , t+N, with N>0, based on uncontrolled parameters or a subset of uncontrolled parameters up to time point t−1 or less and optionally based on controlled parameters or a subset of controlled parameters e.g. at time points t, . . . , t+N, optionally further including e.g. t−1, t−2, . . . or at other time points suited to make forecast with the specific structure of the chosen model.

Preferably the long-term model is a time series-based model including an intrinsic time dependency and forecasting the target operating parameters at times t, . . . , t+N based on the model input at time points up to time point t−1. Here t refers to the starting point of prediction in time. As such the long-term models allows for determining reactor or catalyst performance and changes of reactor or catalyst performance for preferably extended periods of time without available information of uncontrolled parameters beyond the starting point of the forecast. These models have at least some intrinsic time dependency and forecast the performance at times t, . . . , t+N based on uncontrolled parameters up to time point t−1 and optionally based on controlled parameters e.g. at time points t, . . . , t+N or at other time points suited to make forecast with the specific structure of the chosen model.

In one embodiment the processing device is further configured to pre-process operating data prior to the determination via the data-driven model. Preferably the pre-processing includes a transformation to quantities independent of a physical plant layout. Pre-processing allows for taking systematic and non-systematic differences between different plants into account. Hence it enables broad applicability of the determination of target operating parameters even if data from a specific plant in question was not used for training the data-driven model. In particular the transformation includes systematic factors as input parameters for the data-driven model and/or normalization of operating data.

In a further embodiment the data-driven model is validated before determining the at least one target operating parameter. Such validation enhances interpretability and confidence on the determined target operating parameters. For validation operating data and the at least one target operating parameter as measured or derived during the current production run for one or more point(s) in time may be received via the communication interface. The operating data may be used to determine the at least one target operating parameter corresponding to a point in time, where a measured target operating parameter is available. The result of the determined target operating parameter for a point in time and the measured operating parameter corresponding to the same point in time may be compared. If the comparison leads to a valid model operation, e.g. if the difference is less than a threshold or no systematic errors are identified, the determination of at least one target operating parameter for the operating condition based on the set of operating data including at least one desired operating value may follow. If the comparison leads to an invalid model operation, an alert may be triggered, e.g. via a display device or audio device, signifying that the model operation is not suitable for monitoring and/or controlling the subject chemical plant under current operating conditions.

In a further embodiment the data-driven model is selected based on catalyst type before determining the at least one target operating parameter. The catalyst type may be received via the metadata signifying the type of catalyst used, e.g. via a catalyst type identifier. The catalyst type may specify the catalyst formulation. Such option allows for a highly flexible use of the systems, computer programs, computer program products and methods, not only covering different chemical production plants but also different catalyst types. A further degree of flexibility may be added by selecting the data-driven model based on input and output parameter identifier before determining the at least one target operating parameter. The input and output parameter identifier may specify, which parameters are used as operating data and which parameters are used as target operating parameter in the system or method. In such implementations different data-driven models may be stored in a memory of the system including catalyst type and/or parameter identifier for each model, based on which the selection step may be performed.

In one embodiment the training of the data-driven model is performed based on training data, which includes the catalyst type identifier. The trained model may be stored together with the catalyst type identifier and may be provided together with catalysts of that type, preferably including a catalyst type identifier. Such identification may be implemented electronically via a catalyst ID stored in a data base or in a mobile storage medium attached to the catalyst delivery container e.g. in connection with the respective chemical production plant. In such case the model is preferably trained based on training dataset measured in production runs, which used catalysts of the same catalyst type as indicated by the catalyst type identifier. Hence the catalyst may be bundled with the data-driven model and can aid more robust control for the production plant running with the catalyst of specific catalyst type.

A method of predicting short-term and forecasting long-term behavior of a catalyst e.g. in a fixed bed catalytic reactor as a function of reactor operation parameters or operating data and catalyst age or a catalyst age indicator is provided. The method uses a data driven model, preferably a data driven machine learning model, which does not involve a priori information on reaction kinetics. The model is able to predict both the short-term and long-term behavior of the catalyst as a function of input parameters, including typical reactor operating parameters or operating data and parameters derived from sensor and analytical raw data available in the production plant. A software product for performing the method is also provided. As an application example, the method is used to predict and forecast the behavior of a catalyst and a technical reactor for converting ethylbenzene to styrene.

The present disclosure provides a computer-implemented method of predicting short-term and forecasting long-term performance of a catalyst in a chemical production plant including a catalytic reactor, including catalyst aging effects. The method involves using a mathematical model of the chemical production plant and particularly the catalytic reactor which is based on machine learning, involves no a priori information on reaction kinetics and uses input parameters selected from sensor raw data, derived parameters, reactor operating parameters or operating data, plant metadata and parameters indicative of the catalyst age or a catalyst age indicator.

In one embodiment, the operating data are selected from sensor data available from the chemical production plant, particularly the catalytic reactor, analytical data from e.g. gas chromatography (GC) analytics, and derived parameters as laid out above.

In one embodiment, the operating data include inlet temperature and outlet temperature of one or more catalytic reactor(s), preferably of each of the one or more catalytic reactors, inlet pressure and outlet pressure of one or more catalytic reactor(s), preferably of each of the one or more catalytic reactors, and composition of the reaction mixture at the inlet and outlet of one or more catalytic reactor(s), preferably of each of the one or more catalytic reactors.

In one embodiment, particularly applicable to a styrene production plant, the operating data include steam-to-oil (STO) ratio, liquid hourly space velocity (LHSV), total production of styrene normalized by catalyst volume, target ethylbenzene conversion, styrene selectivity, average inlet temperature, normalized pressure after the last catalytic reactor, normalized pressure drop over the one or more catalytic reactors, temperature loss over the one or more catalytic reactors, normalized deviation of temperature loss compared to an expected (calculated on the basis of conversion) value. An advantage of such a parameter set is that it is still interpretable, as many of the parameters correspond to actual operating parameters or can easily be interpreted in that context. Other approaches to reduce the number of dimensions of the problem (e.g., PCA or RFA) can lead to parameters which are useful for the modeling process and predictive accuracy, but often lack interpretability.

The data-driven model preferably performs time-series forecasting and is able to cover the full deactivation process of the catalyst during a whole production run in the reactor system. The model enables the plant operator to improve and optimize operation policies on a day-to-day basis according to the energy costs, market supply of the raw material or need for the plant product, and other limitations which may occur in the plant, like outages of different plant parts or utilities.

In one embodiment, the forecast period spans the remaining lifetime of the catalyst as determined from limitations of the operating condition, preferably a maximum reactor temperature that may be operated. The model allows for determining the remaining lifetime of a catalyst in use based on the forecasted operating conditions and the limitations of these operating conditions, e.g. a maximum reactor temperature or pressure that may be operated. This enables the operator to reliably plan the time left until the next catalyst exchange and also to simulate different operation policies in order to extend the catalyst lifetime, if needed, or to get the maximum production rate from the remaining time until the next planned plant shutdown.

In one embodiment, the data-driven model is used to predict operating condition of a catalyst in a production plant which has not provided historical data for training the data-driven model.

In one embodiment the output of the data-driven model is used for optimizing an operating condition of a scheduled production run or a current production run of a chemical production plant. In such an embodiment target operating parameter(s) as determined via the data-driven model for more than one operating condition are received and fed into an optimization processing device. The optimization may include one or more optimization target(s). The optimization target may be specified by e.g. the optimization parameter(s) or the target parameter(s) to be optimized. In this context optimization target may further include finding a minimum or a maximum of the specified optimization parameter(s) or the target parameter(s). In addition to the target parameter(s) for more than one operating condition the optimization target(s) may be received and fed to the optimization processing device. E.g. an operator may be provided with a selection of possible optimization targets and the chosen optimization target may be received based on the users selection.

In case of one or more optimization target(s) one optimal solution may exist and may be provided as a result of the optimization. Such optimal solution may be provided to a system for monitoring and/or controlling. The optimal solution may be displayed on a display device or used to control the chemical production process. In case of more than one optimization target or a multi-objective optimization one or more optimal solutions may exist and may be provided as a result of the optimization. The multiple optimal solutions may be provided to a system for monitoring and/or controlling and displayed on a display device. In such a case the operator of the plant is enabled to chose between the multiple optimal solutions, which simplifies the decision process in complex situation of operating the chemical production plant.

In a further embodiment the optimization processing device determines based on target operating parameter(s) as output by the data-driven model, a minimum or maximum value of the target operating parameter(s) or a minimum or maximum value of at least one optimization parameter derived from the target operating parameter(s). In one exemplary scenario a remaining life time of the catalyst may be the optimization parameter derived from the target operating parameter(s) and finding the maximum is the target of the optimization process. Furthermore, constraints may be included into the optimization problem. Constraints on the target operating parameter(s) side may include the maximum reactor temperature, minimum selectivity or minimal production volume per day. In another exemplary scenario a production volume over the catalyst's remaining lifetime or until a scheduled point in time for catalyst exchange may be the optimization parameter derived from the target operating parameter(s) and finding the maximum is the target of the optimization process. Constraints on the target operating parameter(s) side may include the maximum reactor temperature, minimum selectivity or minimal and optionally maximal production volume per day.

In another exemplary scenario multiple objectives may be combined. E.g. a remaining lifetime of the catalyst at production volume over the catalyst lifetime may be the optimization parameters derived from the target operating parameter(s) and finding the maximum remaining lifetime combined with the maximum production volume is the target of the optimization process. Constraints on the target operating parameter(s) side may include the maximum reactor temperature, minimum selectivity or minimal production volume per day. In a further example the multiple objectives further include the optimal timing for catalyst exchange further considering cost aspects such as remaining production volume, energy demand, expense of catalyst exchange or combinations thereof. For multi objective optimization known pareto optimization techniques may be used.

In one embodiment, the data-driven model is used to simulate expected catalyst performance, production rates (e.g. total amount of styrene produced over a period of time), energy demands (associated with e.g. reactor or steam-reactant heating) and costs or profits (e.g. related to reactant costs, market prices of product, energy costs, . . . ) for chosen sets of operating data or operation parameters in a catalytic reactor. Here production yield, energy consumption, $CO_2$-emission, costs, side products, catalyst exchange intervals, remaining lifetime or combinations thereof may be target operating parameter(s) or optimization parameter(s) derived from the target operating parameter(s). In the optimization different constraints may be defined e.g. constraints for the operating data the determination of target parameters is based on.

In one embodiment, the data-driven model is used to simulate expected catalyst performance, production rates and energy demands for chosen sets of operating data which are not actually achievable in a given plant setup (for instance, a lower pressure level (deeper vacuum), a lower STO ratio, or an additional reactor). This can help the plant manager to better evaluate the economics of potential upgrades to the plant.

In one embodiment, the data-driven model is used to simulate and/or evaluate expected performance and operating conditions for new plants where the catalyst has not been used previously.

The present disclosure also provides a computer program product configured to perform the methods of the present disclosure. In one embodiment, the computer program product is a computer program implemented in a chemical production plant or a styrene production plant, particularly in a computing unit (a computer) integrated therein and/or connected thereto. In one embodiment, the computer program product is integrated into the dashboard of the chemical production plant or styrene production plant.

In one embodiment, the computer program product comprises an interface for entering operating conditions for the chemical production plant. Operating conditions can be historical data from previous production runs or actual operating conditions of the chemical production plant in the current run.

In one embodiment of the computer program product, input parameters or operating data for a forecast are uploaded manually into the computer program product and/or read out from a process control system by the computer program product. In one embodiment, the input parameters or operating data are provided in a formatted data table. In one embodiment, a graphical user interface is provided for the manual uploading of data into the computer program product. In another embodiment, an application programming interface is provided for uploading data into the computer program product.

In one embodiment, the user of the computer program product provides all information specified above (e.g., raw data, corresponding units, plant metadata) to the computer program product. This information can be entered manually, uploaded via a structured data file, or supplied via an application programming interface (manually or automatically). For long term forecasting, the input time series of the target operating parameters preferably covers at least the range required by the time lag structure used in the model. Potentially also control parameters may be included, if their time lags are used in the model as well.

In one embodiment, exogenous operating parameters are entered by the user, e.g., for multiple operating scenarios for which performance is to be predicted. All additional data processing, including formatting, aggregation and prediction, are performed by the software product.

In one embodiment, the forecast produced by the computer program product is presented to the user via a graphical user interface, as a structured data file, or via an application programming interface.

According to a further embodiment, the computer program product is a computer program product that when loaded into a memory of a computing device and executed by at least one processor of the computing device executes the steps of the above described computer implemented method.

The computer program product may be used with or incorporated in a computer system that may be a standalone unit or include one or more remote terminals or devices in communication with a central computer via a network such as, for example, the Internet or an intranet. As such, the computer or processor and related components described herein may be a portion of a local computer system or a remote computer or an on-line system or combinations thereof. Any database and the computer program product described herein may be stored in computer internal memory or in a non-transitory computer readable medium.

Another aspect of the present disclosure is a computer system for forecasting performance of a catalyst in a chemical production plant or for determining operating conditions of a chemical production plant. The computer system comprises at least an interface component configured to access and read operation parameters or operating data and catalyst-specific parameters, particularly catalyst age indicator, and a processor unit implementing a data-driven model and configured to predict performance of the catalyst by feeding the data-driven model with the reactor operation parameters or operating data and the catalyst-specific parameters provided via the interface component. In one embodiment, the computer system is configured to be coupled to chemical production plant including a catalytic reactor via a wired and/or wireless communication connection, and to access and read out the reactor operation parameters or operating data and/or the catalyst-specific parameters at least partly automatically from a process control system of the chemical production plant including a catalytic reactor via the interface component.

A further aspect of the present disclosure is a computer-implemented method for training a data-driven model of a chemical production plant including one or more catalytic reactors based on machine learning for predicting or forecasting performance of a catalyst in the catalytic reactor(s). The method comprises providing a mathematical model as initial basis, providing historical data e.g. from a plurality of production runs of the same type of catalyst and/or from a plurality of production runs in a plurality of chemical production plants or catalytic reactors comprising the same type of catalyst, and, optionally, previously determined target operating parameters or operation and performance parameters of the chemical production plant and in particular the catalytic reactor(s), accessing and importing the provided historical data into the mathematical model, adapting parametrisation of the data-driven mathematical model to the provided historical data, providing an update of the data-driven mathematical model on the basis of the adapted parametrisation, and iteratively repeating the method steps by setting the updated data-driven mathematical model as initial basis.

Another aspect of the present disclosure is a computer implemented method for determining operation and/or performance parameters or target operating parameters of a chemical production plant including one or more catalytic reactors. The method comprises accessing sensor data indicative of operating condition present in the reactor system and catalyst specific sensor data indicative of the catalyst presently used in the reactor system, determining operation and/or performance parameters or target operating parameters of the chemical production plant using a data-driven model, wherein the data-driven model is parameterized according to a training data set, wherein the training data set includes historical data e.g. from a plurality of production runs of the same type of catalyst and/or from a plurality of production runs in a plurality of catalytic reactors comprising the same type of catalyst and previously determined operation and performance parameters or target operating parameters, and providing the determined operation and/or performance parameters or target operating parameters of the chemical production plant including one or more catalytic reactors.

A further aspect of the present disclosure is a computer-implemented method for determining operation and/or performance parameters of a chemical production plant including one or more catalytic reactors. The method comprises accessing sensor data indicative of operating conditions present in the reactor system and catalyst specific sensor data indicative of the catalyst presently used in the reactor system, determining operation and/or performance parameters or target operating parameters of the chemical production plant using a data-driven model, wherein the data-driven model is parameterized according to a training data set, wherein the training data set includes historical data e.g. from a plurality of production runs of the same type of catalyst and/or from a plurality of production runs in a plurality of reactor systems comprising the same type of catalyst and previously determined operation and performance parameters or target operating parameters of the chemical production plant, and providing the determined operation and/or performance parameters or target operating parameters of the chemical production plant.

Another aspect of the present disclosure is a control system for controlling a chemical production plant including one or more catalytic reactors. The control system comprises a computer system as described above, and a control unit which is configured to control an actual and/or scheduled production run in the chemical production plant on the basis of the provided operation and/or performance parameters or target operating parameters of the chemical production plant.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network.

According to a further exemplary embodiment of the present invention, a data carrier or a data storage medium for making a computer program available for downloading is provided, which computer program is arranged to perform a method according to one of the previously described embodiments of the present invention.

It is to be understood that the embodiments described herein are not mutually exclusive of each other, and that one or more of the described embodiments may be combined in various ways, as would be appreciated by one of ordinary skill in the art.

A computer program performing any of the methods of the present invention may be stored on a computer-readable storage medium (e.g., a non-transitory computer-readable storage medium). A computer-readable storage medium may be a floppy disk, a hard disk, a CD (Compact Disk), a DVD (Digital Versatile Disk), a USB (Universal Serial Bus) drive, a RAM (Random Access Memory), a ROM (Read Only Memory) and an EPROM (Erasable Programmable Read Only Memory). A computer-readable medium may also be a data communication network, for example the Internet, which allows downloading a program code. The methods, systems and devices described herein may be implemented as software in a Digital Signal Processor, DSP, in a microcontroller or in any other side-processor or as hardware circuit within an application specific integrated circuit, ASIC, CPLD, FPGA or other suitable device. The present invention can be implemented in digital electronic circuitry, or in computer hardware, firmware, software, or in combinations thereof, e.g. in available hardware of conventional mobile devices or in new hardware dedicated for processing the methods described herein, as will be described in greater detail below.

BRIEF DESCRIPTION OF THE DRAWINGS

Exemplary embodiments of the present invention are illustrated in the appended drawings. It is to be noted, however, that the appended drawings illustrate only particular embodiments of the present invention and are therefore not to be considered limiting of its scope. The present invention may encompass other equally effective embodiments.

DETAILED DESCRIPTION

Figure 1:
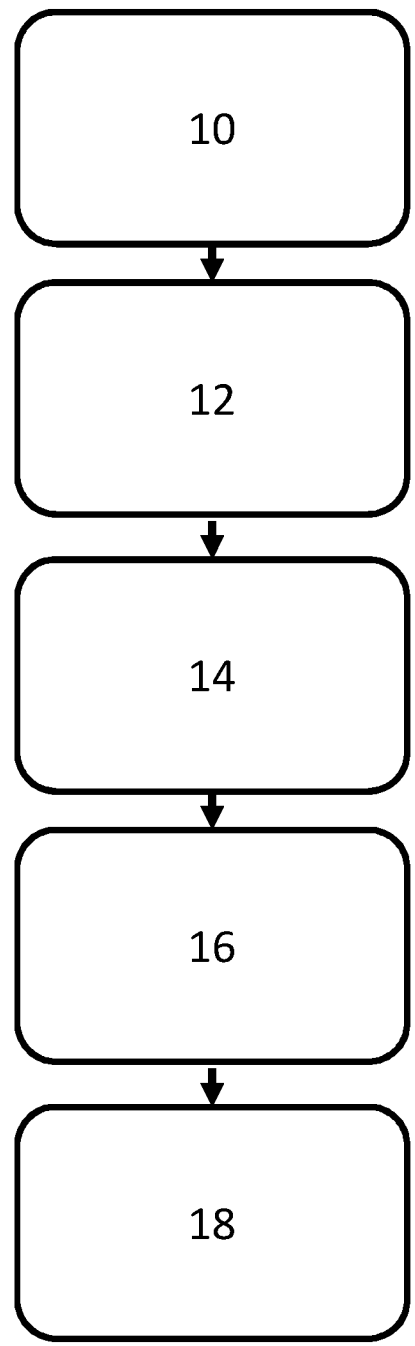
FIG. 1 illustrates an exemplary embodiment of a method for determining an operating condition for a scheduled production run or for a change in a current production run of a chemical production plant including at least one catalytic reactor.

The present disclosure provides a computer-implemented method of predicting short-term and/or forecasting long-term performance of a catalyst in a chemical production plant including at least one catalytic reactor, including catalyst aging effects. The method involves using a mathematical model particularly of the catalytic reactor which is based on machine learning, involves no a priori information on reaction kinetics and uses input parameters selected from sensor raw data, derived parameters, reactor operating parameters, plant metadata and parameters indicative of the catalyst age. The methods, systems, computer programs and computer program products disclosed herein are further described for a styrene production plant, which serves as an example. The methods, systems, computer programs and computer program products disclosed herein are applicable to other production plants with at least one catalytic reactor, particularly with fixed bed reactors.

In case of a styrene production plant a feed stream comprising ethylbenzene is mixed with steam in a mixer. The mixed stream is fed into a catalytic reactor including a potassium-promoted iron oxide-based catalyst for dehydrogenation to styrene monomer. The styrene production plant further includes temperature sensors, pressure sensors, flow sensors or the like at various locations to monitor plant operation.

In the process for the production of styrene monomer, ethylbenzene may be dehydrogenated in adiabatic radial flow reactors. The ethylbenzene is mixed with steam in a specific proportion known as the steam-to-oil (STO) ratio to supply the heat for the endothermic dehydrogenation process and prevent reduction and coking of the potassium-promoted iron oxide-based catalyst used in the process. The reaction is run at high temperatures and subatmospheric pressure, in a setup that usually comprises at least two consecutive reactors. Intermediate re-heating may compensate the energy consumed by the reaction. The low pressure, the dilution with steam, and the high temperature favor the dehydrogenation of ethylbenzene, leading to a higher equilibrium conversion.

Over the lifetime of the catalyst, potassium, which is a coke gasification promotor, evaporates from the catalyst and is carried downstream the catalyst bed to the cooler exit thereof, causing activity loss by catalyst coking. To compensate for the aging of the catalyst, the plant operators increase the inlet temperatures over the catalyst lifetime, in order to keep the ethylbenzene conversion rate constant. The higher temperatures negatively affect the selectivity towards styrene by enhancing cracking and formation of by-products like benzene and toluene. Moreover, the potassium deposits within the catalyst bed and the fines produced from the catalyst cause an increase of the reactor inlet pressure, which is thermodynamically unfavorable. When the inlet temperatures or pressures have increased above the operational limits of the plant, the run has to be stopped and the catalyst needs to be exchanged.

The catalyst performance and its aging rate depend on the operation parameters of the reactors, e.g., the inlet temperatures, the STO ratio, the inlet pressures and outlet pressures, the ethylbenzene flow rate, the number of reactors used etc. The process economics can be greatly improved by optimization of the reactor operation. This has been attempted in the past by using different kinds of reactor models, which have been fitted to catalyst run data originating from experimental or industrial reactors. The models were based on knowledge or assumptions regarding the reaction kinetics for the main and secondary reactions, mass, heat and impulse transport phenomena, adsorption/desorption of different chemical species present in the system, coke gasification and potassium loss kinetics, etc. The methods, systems, computer programs and computer program products described herein, allow for more robust and reliable process control.

FIG. 1 illustrates an exemplary embodiment of a method for determining an operating condition for a scheduled production run or for a change in a current production run of a chemical production plant including at least one catalytic reactor.

If the determination concerns a scheduled production run, operating data indicative of a pre-defined operating condition for the scheduled production run is received in a first step 10 via the communication interface. The pre-defined operating data may result from a previous production run. If the determination concerns the change in the current production run, measured operating data indicative of a current operating condition for the current production run is received in a first step 10 via the communication interface. Furthermore, at least one operating data point may be adjusted such that is includes a desired operating value indicative of the change in the current operating condition. The operating data may include sensor data measured through sensors installed in the chemical production plant, quantities directly or indirectly derived from such sensor data, analytical data measured in samples taken from the chemical production plant, and/or quantities directly or indirectly derived from such analytical data.

Furthermore, a catalyst age indicator associated with a period of time the catalyst has been used in the current or scheduled production run is received via the communication interface. The catalyst age indicator may be based on a point in time, a time period, a quantity derived from time dependent operating data and/or a quantity cumulatively derived from time dependent operating data. Additionally, plant metadata indicative of a physical plant layout may be received, via the communication interface.

In a second step 12 the operating data and the plant metadata may be pre-processed, via the processing device, prior to determination of the at least one target operating parameter. Preferably the pre-processing includes a transformation to quantities independent of the physical plant layout.

In a third step 14 at least one target operating parameter for the operating condition of the scheduled production run or the change in the current production run based on the operating data and the catalyst age indicator using a data-driven model is determined, via the processing device. The determination of the at least one target operating parameter may additionally be based on the plant metadata. The data driven model is parameterized according to a training dataset. The training dataset may be based on sets of historical data comprising operating data, catalyst age indicator, the at least one target operating parameter and optionally the plant meta data. The sets of historical data may include data from multiple runs, multiple plants and/or multiple catalyst batches. The determination of the at least one target operating parameter may be based on a short-term model determining target operating parameters for discrete points in time or a long-term model determining target operating parameters for a period of time.

In case of a long term model, a time series of the at least one target operating parameter as measured, predicted or derived during the current or a previous production run up to a prediction start point in time may be received via the communication interface in step 10. The determination (14), via the processing unit, of the at least one target operating parameter for one or more points in time following the prediction start point in time may be based on the operating data including the desired operating value, the time series of the at least one target operating parameter, the catalyst age indicator and optionally the plant meta data using the data-driven model. Preferably the data-driven model includes an intrinsic time-dependence.

In a fourth step 16 the at least one target operating parameter for the operating condition of the scheduled or the change in the current production run may be provided via the communication interface.

In a fifth step 18 the determined target operating condition may be provided to an optimization processing device for optimizing an operating condition of a scheduled production run or of a change in a current production run of a chemical production plant. Here for more than one operating condition of the scheduled production run or of the change in the current production run, the determined target operating parameter(s) may be received, via the communication interface between the optimization processing device and the processing device. Based on the received target operating parameter(s) a minimum or maximum value of a target operating parameter or a minimum or maximum value of an optimization parameter derived from the target operating parameter(s) may be determined, via the optimization processing device, and the minimum or maximum value indicative of an optimal operating condition of the scheduled production run or for the change in the current production run may be provided via the communication interface.

Pre-Processing of Operating Data

Figure 2:
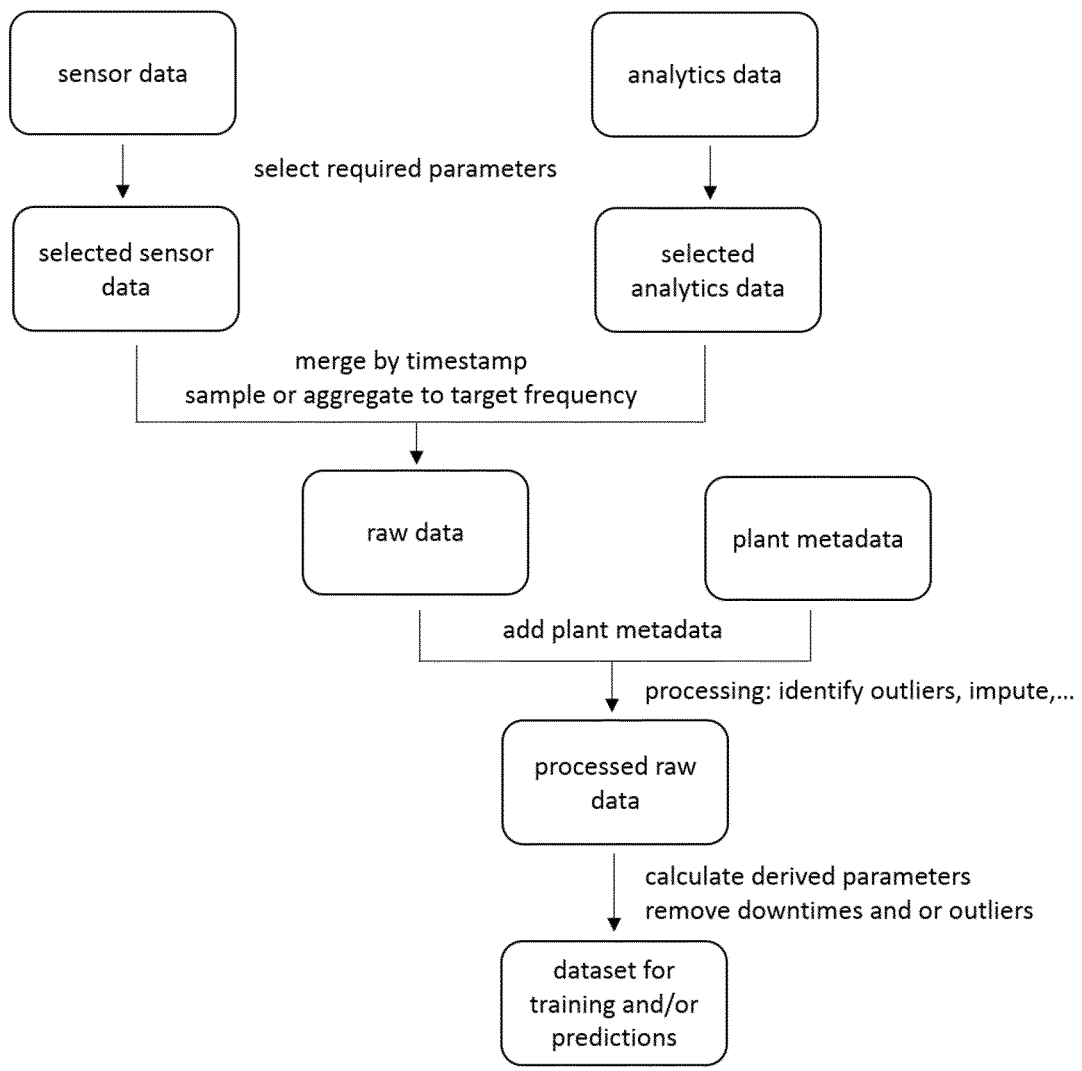
FIG. 2 shows a high-level workflow of pre-processing raw data from an individual plant into dataset ready for model training or predictions.

FIG. 2 shows an exemplary workflow of pre-processing data into a format appropriate for model training, predictions via the short-term model or forecasting via the long-term model.

In a first step measured operating data is received optionally followed by a pre-processing method. If the data is prepared for training, such operating data may include sets of historical data from multiple runs, multiple plants and/or multiple catalyst batches. If the data is prepared for prediction or forecasting, such operating data may include measured operating data indicative of the current operating condition for the current production run. The operating data preferably includes sensor data measured through sensors installed in the styrene production plant, and/or analytical data measured in samples taken from the styrene production plant.

For each production plant, there are many sensors available, typically hundreds or even thousands, that provide raw data at their individual sampling rate. In addition, analytical data, e.g. results from gas chromatography are available for specific times at which samples have been taken from the plant. How often this data is available varies between plants, but typical frequencies are once per day up to once per week.

In a first pre-processing step, the operating parameters may be selected from the operating data, which form the input parameters for the data-driven model. These input parameters may be derived from raw parameters such as sensor data or analytical data. An exemplary process on how to select these raw parameters from all available parameters when setting up the data driven model is outlined in more detail below.

In a second pre-processing step data from analytics and selected sensors may be combined based on their timestamp and particularly pre-processed onto a common time scale. For many plants only daily aggregates of the raw sensor data may be available, rather than high frequency raw data, and this is also a typical frequency at which analytical data is available, daily averaging may be used to bring all data on the same time basis. Other merging techniques can be applied as well and are well-known, e.g. interpolation of the daily data (both analytical and sensors) and sampling at higher or lower frequencies of interest, e.g. to create hourly data.

Additionally, plant metadata may be received. The plant metadata, e.g. the catalyst active volume and the number of reactors, may be added as numerical or categorical variables to the dataset to complete the set of input parameters of the model including derived parameters.

In a third pre-processing step, the received and selected operating data may be filtered and smoothed. Here e.g. a point in time and duration of maintenance intervals, startup phases, irregularities and outliers may be identified and optionally filtered. To achieve this, many options are known to someone skilled in the art, and any combination of such methods may be used. For instance the procedure includes, applying viable absolute thresholds based on catalyst domain knowledge, like a minimum reactor temperature, a maximum steam/oil-ratio and a maximum pressure after the reactors; identifying outliers by comparing each value or set of values to the distribution of all other values of the same parameter or set of parameters available from the respective production plant, e.g. using absolute thresholds based on distribution metrics like 6 times the interquartile range (a conservative threshold used in the example application) or alternatively based on the estimated likelihood of the data point originating from the overall distribution and/or identifying irregularities based on big jumps of parameters compared to the monthly coefficient of variation for this parameter.

In a fourth pre-processing step, missing data points on the common time scale may be detected and substituted with statistically determined values. Such potentially missing parameters may be imputed. Specifically, analytical data may be imputed, if these data have been sampled less frequently than the chosen time basis. Imputations may be determined from different methods, e.g. simple mean imputation, forward or backward filling, weighted means or estimates from Kalman filters or comparable estimation methods. The same methods may be applied to replace outliers. The start of run may be identified based on criteria defined by experts, e.g. as the first data point with an hourly space velocity >0.2/h in the styrene catalyst example. All derived parameters may then be calculated, including e.g. the cumulative plant production.

Depending on the nature of the derived parameters, especially the cumulative parameters, the identified startup phases, downtimes etc. may be removed from the dataset before or after calculating the respective derived parameters. In an exemplary embodiment, the cumulative production since the start of the run, which the implemented age indicator is based upon, is calculated before the startup phases were removed from the data set as they contribute to ageing of the catalyst, even though these phases are not part of the operating conditions covered by to model.

One further pre-processing step not depicted in FIG. 2 may be the transformation of data from different plants to common units. It is preferable and straightforward to do this before the workflow in FIG. 2 is started, even though this may also be performed before or after any step in the process.

At this point, the data is ready to be used for training, forecasting with a long-term model or predicting with a short-term model. However, since the filtering procedures may result in some gaps in the data, and the time scales for forecasting are typically much longer, e.g. months, compared to the available time basis, e.g. days, an additional aggregation step, e.g. weekly mean or median aggregation, may be performed on the data before it is used in the long-term model.

Parameter Selection Process

Figure 3:
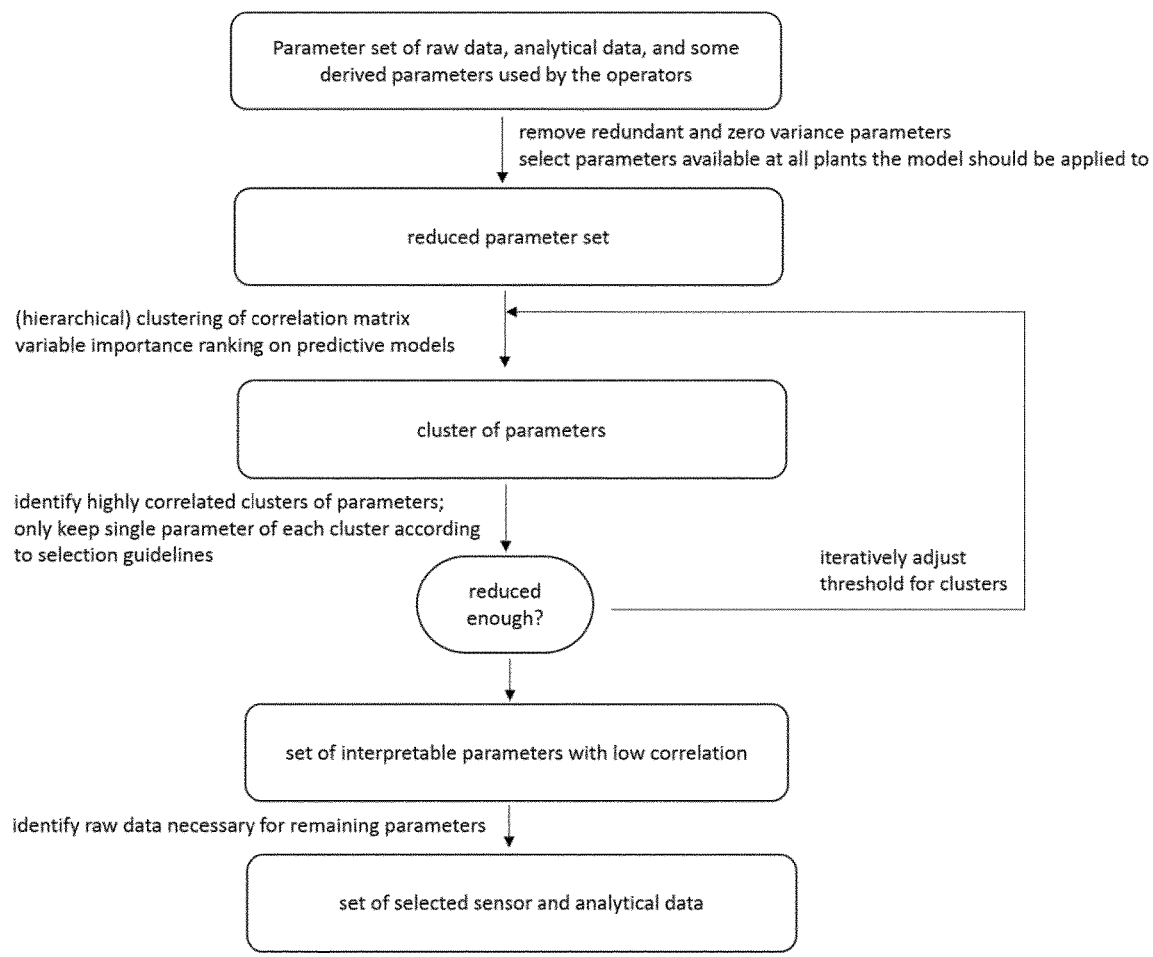
FIG. 3 shows an example workflow for the identification of a raw data set selection as basis for the model.

The operating data or raw parameters of interest may be determined via the workflow sketched in FIG. 3. The parameters available to the catalyst experts, serve as the basis, consisting of a combination of raw sensor data, analytical data and some typical operating parameters derived from the them, e.g. conversion, space velocity, steam/oil-ratio, selectivity. In a first step, if data from multiple plants is used, only parameters available from all plants of interest may be selected (if only one plant is to be modelled, this criterium is obsolete), and redundant parameters (e.g. rescaled parameters) and zero-variance-parameters may be dropped.

Next, a correlation matrix of the remaining parameters may be calculated and clustering, e.g. hierarchical clustering, of the parameters may be carried out to identify pairs or clusters of parameters carrying similar information. Instead of a clustering algorithm, a simple filter for high (anti-) correlation values, e.g. (>0.90 or <−0.90) or (>0.95 or <−0.95) can be applied. However, clustering of the correlation values with all other parameters further allows to identify parameters which might have lower direct correlation but have very similar correlation values with all other parameters. From each cluster of two or more parameters, only a single parameter may be retained based on a certain selection criteria like: the parameter needs to be available for all plants; the typical parameters routinely used by the operator need to be kept (which is the exception that may lead to keeping more than a single parameter) and the parameter should represent an interpretable quantity, which is also the reasoning not to reduce the dimensionality via a principal component transformation or similar methods that produce features not directly interpretable by the operator.

Based on these criteria, the parameter set can be iteratively reduced, by adapting the cluster threshold if necessary. The number of parameters may be reduced iteratively until a set of parameters (1, . . . , M) remains, where only low correlation between parameters persists. Some remaining relatively high correlation values stem from parameters which may be important to the operator and may therefore not be removed.

Once the parameter set has been reduced, the raw sensor and analytical data are identified which are required to obtain all these remaining parameters.

Normalization of Parameters and Plant Metadata

Different plants vary in their production levels, their typical operating conditions and often exhibit systematic differences. To account for such differences between different plants one of two strategies or a combination of two strategies may be applied as lined out below.

In a further pre-processing step normalization may be performed. In one embodiment plant metadata indicative of the physical plant layout may be received. Such plant metadata may include the reactor layout such as the number of reactors, the active catalyst volume, reactor types, dimensions or combinations thereof.

Normalization of the operating data may be performed to make the model input parameters (except for the plant metadata) as independent as possible from the specific plant layout. For many parameters, e.g. steam/oil-ratio, conversion, selectivity, there is no need for normalization. Additionally, parameters like liquid hourly space velocity (LHSV) is intrinsically normalized by the catalyst volume. Additionally or alternatively, the amount of total product over the catalyst production run per catalyst or the cumulative total production may be normalized by the active catalyst volume, because this is a more comparable measure for the "age" of each unit volume of catalyst than the time on stream (where variations in production levels are not captured) or the unnormalized cumulative production (which will have a different meaning for differently sized reactors).

Additionally or alternatively, pressures may be normalized to their initial values during the start of the run, e.g. the median value of the first 90 days on stream, in order to focus on the aging effect rather than the—in some cases more pronounced—interplant differences. Additionally or alternatively, the pressure drop over each unit like a reactor or a heat exchanger may be normalized by the space velocity or the total flow rate, since it is known that it varies with the superficial linear velocity of the gas mixture. Additionally or alternatively, an average inlet temperature of more than one, e.g. 2 or 3, reactors may be determined.

Ultimately, there are other plausible ways of making the operating data, analytical data and any quantity derived therefrom comparable between plants beyond the examples mentioned in this section; and there may be other useful reactor/plant metadata, specifically regarding reactor geometries, that may be used in a similar fashion.

The reason for finding such normalized parameters is that the usage of data from multiple different plants offers a number of significant advantages: 1) the parameter space covered by an aggregated data set is much larger than that of any individual plant, which typically operates around a relatively narrow set of operating parameters the operator is familiar with, since wrongly deviating from this may cause severe monetary losses. Therefore, the model(s) trained on such an aggregated dataset may provide predictions outside the operating range of a specific plant as it includes information not available from their own historic data. 2) Owing to the long lifetime of the exemplary styrene catalyst (2-3 years), only 1-4 runs of a certain type of catalyst are available per plant, severely limiting the number of deactivation processes that can be observed per plant (each run only provides a single independent observation of catalyst deactivation). The aggregated dataset allows to include a larger number of deactivations into the training data. 3) Combined with the selection process of parameters, which emphasizes interpretability and availability of the commonly used operating parameters, this allows the trained model(s) to be applied to plants where no prior actual data is available—a situation often encountered when technical proposals need to be provided for new plants, which would not be possible if the model was strictly linked to a specific sensor set available at a specific plant.

Short-Term Model(s)

For the short-term prediction of the catalyst behavior, any regression model may be used and those skilled in the art know a variety of the typical model candidates. Depending on the nature of the data in chemical production plants, typically a low number of independent runs and—even after normalization of a number of parameters—some potential plant-specific biases, models of relatively simple nature and not too flexible may be chosen. In such a scenario with low number of independent runs a highly flexible model, e.g. a random forest regression will fit the training dataset better but may poorly extrapolate to new data. Hence depending on the number of runs available a suited type or combination of regression-based model may be chosen.

One possible model may be an ensemble of linear models trained on subsets of the training data in order to e.g. predict the average reactor inlet temperature and the selectivity of the reaction. Using such an ensemble has two advantages: first, using model ensembles for prediction, e.g. by retrieving the median prediction of all models, can lead to more accurate predictions [e.g. Ensemble Methods—Foundations and Algorithms, Zhi-Hua Zhou; CRC Press 2012]; and second, training an ensemble this way provides an estimate of the model uncertainty by using the range of predictions (or the 10% and 90% percentile, or any other range of prediction quantiles, . . . ).

When using training data from multiple catalyst batches, multiple runs and/or multiple plants, the training and test data set may be split by individual runs. Additionally, or alternatively, the training and validation data set may be split by individual plants or catalyst batches. For example, a random set of about 75% in the training set may be selected and the parameters may optionally be normalized (to zero mean and unit variance) during pre-processing. The remaining data may be used as validation data set to test the trained model.

Long-Term Model(s)

For time-series forecasting, a large number of mathematical models may be used, ranging from autoregressive models to recurrent neural networks. The requirements for models to apply to the exemplary problem at hand include: 1) applicability to multivariate time-series, i.e. prediction of multiple endogenous (uncontrolled) parameters which undergo long-term trends that are to be forecasted, e.g., pressures, inlet temperature or selectivity; 2) integration of exogenous (controlled) parameters, i.e., highly influential parameters which are known or will be controlled externally and therefore do not require forecasting by the model, like the steam/oil-ratio, LHSV, target conversion.

A preferred embodiment of the method involves a mathematical model which allows for regularization to avoid overfitting, which can easily occur when multiple time lags are included in the mathematical model. In one embodiment of generating the mathematical model used in the method of the present disclosure, an ensemble of mathematical models is implemented which is mainly based on combinations of penalized linear models and penalized vector autoregressive models with exogenous variables (VARX). For an overview of penalized VAR(X) models, including different structured regularization methods, see e.g. [arXiv:1508.07497v1 (Nicholson et al 2018, VARX-L: Structured Regularization for Large Vector Autoregressions with Exogenous Variables)] and references therein.

The train/test split is carried out as for the short-term model between runs. All candidate models may be trained to predict endogenous variables at time t based on exogenous variables at time t and the history of endogenous variable up to a maximum time lag m (t−m, . . . t−1). Iteratively applying such a model step by step, and at each new step using the forecast of the endogenous variables as input for the next step, allows to make forecasts going an arbitrary number of steps ahead.

The training procedure may be performed using leave-one-out cross-validation on the level of plants. Here for N plants in the dataset, N sets of training data may be generated (consisting of data from all other plants), their parameters may optionally be standardized to have mean 0 and a comparable range of values, and the trained models may be evaluated on the plant that was left out (validation set). Ultimately, the model hyperparameters (e.g. regularization parameters) may be selected, which give the most robust performance on the N validation sets, e.g. measured by the average root mean squared error of the one-step-ahead forecast, and the model may be trained on the full training set.

As the mathematical model used in the method of the present disclosure is based on machine learning, it has to be trained with historical data from at least one production run in a chemical production plant including at least one catalytic reactor prior to being used for predicting short-term or forecasting long-term performance including aging of a catalyst used in such a reactor system. In one embodiment of the method of the present disclosure, the model has been trained using historical data from a plurality of production runs of the same type of catalyst. In a further embodiment of the method, the model has been trained using historical data from production runs in a plurality of reactor systems comprising the same type of catalyst. In both of these embodiments, the historical data may be provided from different manufacturing batches of the same type of catalyst. In one embodiment of the method, the operating data and potentially the catalyst age indicator of the plurality of production runs have been normalized prior to being used for training the model e.g. as described in the section above.

It has been found that using operating data from more than one production run, be it from one and the same plant or from different plants, enhances the prediction quality and broadens the operating parameter range covered by the prediction or forecasting model. Including data originating from multiple runs and plants further improves the generalizability of the prediction or forecasting for application to a production plant from which no data was available during training of the model. It is however preferred that all data used to train the model are provided from plants using the same catalyst formulation, since different catalysts differ significantly in their catalytic properties (reaction rates) and morphological properties (transport properties). This includes the use of catalyst of the same type provided from different manufacturing batches or different delivery date.

In one embodiment, the input parameters for the model are selected from sensor data available from the reactor system, analytical data e.g. from gas chromatography (GC) analytics, and derived parameters as laid out in the respective section above.

In one embodiment, the operating data or reactor operation parameters include inlet temperature and outlet temperature of each reactor, inlet pressure and outlet pressure of each reactor, and composition of the reaction mixture at the inlet and outlet of each reactor.

In one embodiment, the operating data or input parameters of the model include steam-to-oil (STO) ratio, liquid hourly space velocity (LHSV), total production of styrene normalized by catalyst volume, target ethylbenzene conversion, styrene selectivity, average inlet temperature, normalized pressure after the last reactor, normalized pressure drop over the reactors, temperature loss over reactors, normalized deviation of temperature loss compared to the expected (calculated on the basis of conversion) value.

An advantage of the parameter set used in the methods or systems of the present disclosure is that it is still interpretable, as many of the parameters correspond to actual operating parameters or can easily be interpreted in that context. Other approaches to reduce the number of dimensions of the problem (e.g., PCA or RFA) can lead to parameters which are useful for the modeling process and predictive accuracy, but often lack interpretability.

The mathematical model used in the method of the present disclosure performs time-series forecasting and is able to cover the full deactivation process of the catalyst during a whole production run in the reactor system. The model enables the plant operator to improve and optimize operation policies on a day-to-day basis according to the energy costs, market supply of the raw material or need for the plant product, and other limitations which may occur in the plant, like outages of different plant parts or utilities.

The subject matter of the present disclosure is further described and explained in the following working examples.

EXAMPLES

Generation of Dataset for Training the Mathematical Models

To develop the mathematical models, data was used from several production runs of the same catalyst type (BASF S6-42). The dataset covers 11 industrial plants with 2 or 3 reactors and information about 1-4 production runs in each of the plants. For each individual plant, a full set of parameters (including analytical data and sensor data) was collected. The sensor data were typically available at a daily resolution, while the analytical data was available at a daily to weekly resolution.

The process of parameter selection for the model has been described above (FIG. 3)

Table 1 lists the operating data from raw sensor and analytical parameters which were selected at each point in time in order to derive all relevant parameters for the model. These units and formatting choices are only one example which can be used; the temperature could e.g. also be specified in degree Fahrenheit, the pressure could be specified in mmHg, another date and time format may be used, etc.

TABLE 1

| Parameter name | Units/ format | Parameter description | comment |
|---|---|---|---|
| date | ISO-8601 | date and time | |
| pin1 | kPa | pressure before reactor 1 | |
| pout1 | kPa | pressure after reactor 1 | |
| pin2 | kPa | pressure before reactor 2 | |
| pout2 | kPa | pressure after reactor 2 | |
| pin3 | kPa | pressure before reactor 3 | only for 3 reactors |
| pout3 | kPa | pressure after reactor 3 | only for 3 reactors |
| Tin1 | ° C. | temperature reactor 1 in | |
| Tout1 | ° C. | temperature reactor 1 out | |
| Tin2 | ° C. | temperature reactor 2 in | |
| Tout2 | ° C. | temperature reactor 2 out | |
| Tin3 | ° C. | temperature reactor 3 in | only for 3 reactors |
| Tout3 | ° C. | temperature reactor 3 out | only for 3 reactors |
| flow feed (EB) | kg/h | flow feed (EB) | |
| flow total steam | kg/h | flow total steam | |
| feed_benz | | % Benzene (Feed) | fractions are calculated by weight (wt %) |
| feed_EB | | % Ethylbenzene (Feed) | |
| feed_styr | | % Styrene (Feed) | |
| feed_tol | | % Toluene (Feed) | |

TABLE 1-continued

| Parameter name | Units/ format | Parameter description | comment |
|---|---|---|---|
| out_benz | | % Benzene (Out) | |
| out_EB | | % Ethylbenzene (Out) | |
| out_styr | | % Styrene (Out) | |
| out_tol | | % Toluene (Out) | |

The number of reactors and the total catalyst volume were additionally used as metadata. The following Table 2 lists the set of parameters (derived parameters and plant metadata) used for training of the different models.

TABLE 2

| parameter name | parameter description | values/ range/ units | type |
|---|---|---|---|
| reactors | number of reactors | 2, 3 | categorical |
| temperature | average reactor inlet temperature | ° C. | numeric |
| pressureOut | normalized pressure after last reactor | | numeric |
| deltaT | temperature decrease over reactors | ° C. | numeric |
| SOR | steam/oil-ratio (kg/kg) | kg/kg | numeric |
| LHSV | space velocity | 1/h | numeric |
| conversion | target conversion | 0-1 | numeric |
| selectivity | styrene selectivity | 0-1 | numeric |
| feedBenzene | benzene fraction in feed | 0-1 | numeric |
| feedEB | ethylbenzene fraction in feed | 0-1 | numeric |
| feedStyrene | styrene fraction in feed | 0-1 | numeric |
| feedToluene | toluene fraction in feed | 0-1 | numeric |
| CatVolume | catalyst volume | $m^3$ | numeric |
| deltaP | normalized pressure loss over reactors | | numeric |
| totalProduction | cumulative production normalized by catalyst volume | a.u. | numeric |
| dTdev_norm | deviation from expected temperature drop (based on feed amount converted), normalized by catalyst volume | ° C./$m^3$ | numeric |

Exemplary Application: Short-Term Model
Model Development

As described above, ensembles of 50 linear regression models have been trained on a subset of the training dataset, with each subset split between runs. Each of the 50 reduced training sets contained randomly chosen ~74% of the available runs, to both improve the prediction and provide estimates about the local uncertainty of model predictions (given that each model is trained on different subsets of e.g. operating conditions). Importantly, the subsets of data need to be split between runs (or alternatively between plants), instead of a random sampling of training data points. Otherwise, there will hardly be any variation between the models, as all models are trained on a nearly identical distribution of operating conditions.

In the presented example, specifically the parameters "temperature" (average reactor inlet temperature) and "selectivity" (of the reaction to the desired product styrene) have been predicted using all other parameters from Table 2.

In this specific implementation, the reaction temperature itself is one of the major influencing factors for the observed selectivity. Therefore, the prediction of both parameters is carried out in two steps. First, a 50-model ensemble is trained to predict the temperature based on all parameters from Table 2 (excluding selectivity and temperature). A second ensemble of 50 models was trained to predict selectivity using all parameters from Table 2 as input (excluding only selectivity). This second ensemble is then used to predict selectivity using the predicted temperature from the first model ensemble as one of the input parameters.

In the practical use of this developed model, the workflow of subsequently predicting both parameters have been implemented in a single prediction function, which receives the input parameters and predicts both temperature and selectivity. Therefore, the combination of both model ensembles may be regarded as a single entity of a "short-term" model from the outside for all uses of the model.

Beyond the direct use of the parameters in Table 2, also interaction terms were considered, and finally e.g. the "steam/oil-ratio—conversion" interaction was integrated into the short-term model predicting the temperature. Such interactions or higher order polynomial terms, e.g. quadratic terms for the temperature for the selectivity prediction, can easily be implement into predictive models using statistical programming languages without the need to extend the basic set of parameters supplied to the model.

Which type of model to choose, whether or not to use ensembling techniques, and which higher-order terms, transformations or interactions of the input parameters to use, depends on the specific question and dataset; and is a typical model development procedure for data scientists.

Short-Term Model Use Case 1

In one exemplary use case, a plant operator may want to use a short-term model to estimate the required reactor temperature to achieve a desired target conversion rate at specified operating conditions that might not have previously been used in his plant. In case of a styrene production plant such operating conditions may be an increased steam/oil-ratio or a lower LHSV or a change in the feed composition. Ideally, the starting point for this prediction should be the current plant status, including the normalized age parameter "totalProduction".

Model Implementation

Figure 4:
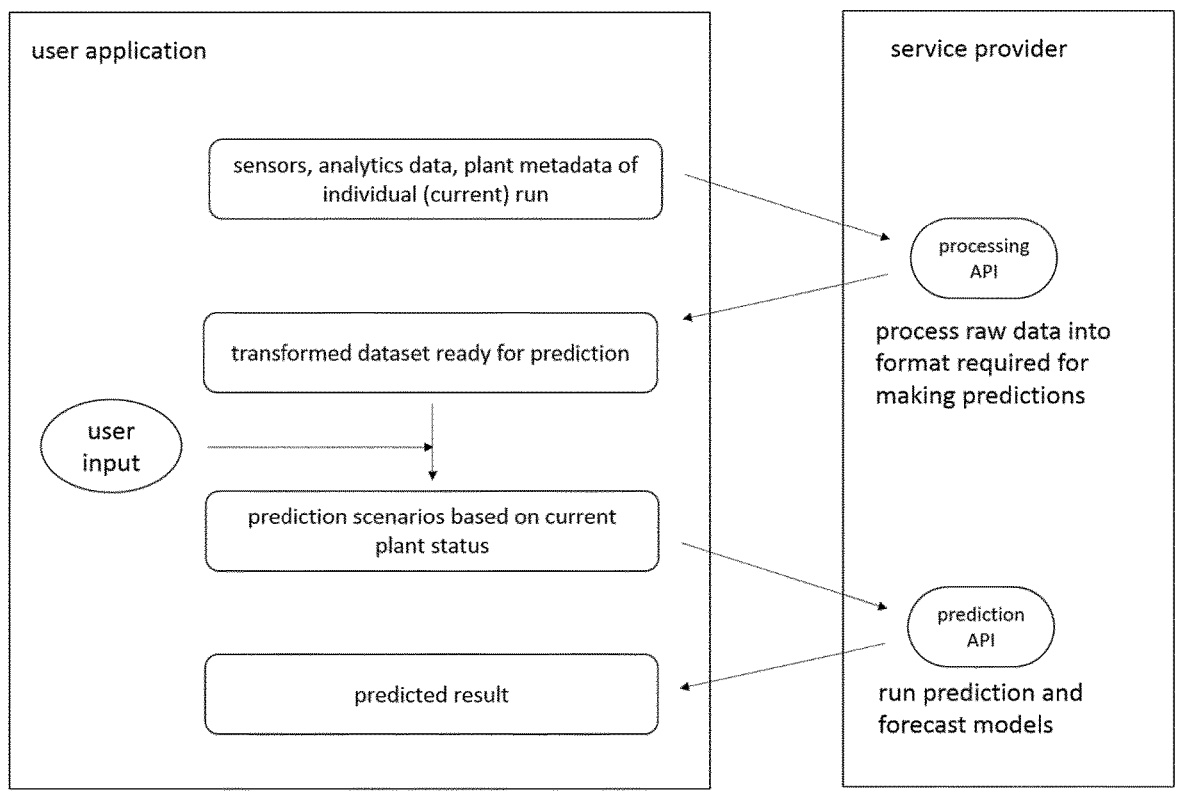
FIG. 4 shows an exemplary implementation of a system for determining operating conditions for the scheduled production run or for the change in the current production run of the chemical production plant.

FIG. 4 illustrates a client server set-up of a production monitoring and/or control system including a client side with a processing device including a user application, a server side with a processing device for a service provider. The client side and the server side may be communicatively coupled, e.g. wired or wireless, via the communication interface. The client side may include a display device. Preferably the client-side user application is configured to receive and display operating data, desired values, catalyst age indicator, plant metadata, target operating parameters or the determined operating condition. Further preferred the client-side user application is configured to receive target operating parameters or the determined operating condition to control the current or scheduled production run in the chemical production plant based on the target operating parameters or the determined operating condition. The client-side user application may be an embedded part of the chemical plant's process monitoring and/or controlling system.

Raw sensor and analytical data are recorded at a production plant together with the necessary plant metadata since the start of the production run. These data are pre-processed according to the data pre-processing workflow as e.g. sketched in FIG. 2, specifically using the identical workflow (filter steps, imputations, thresholds, aggregations, . . . ) as was used for preparing the training dataset for the respective model. Preferably, this pre-processing is implemented by the same party that has developed the model and can be provided to a user application e.g. via direct integration of a pre-processing function, or via an application programming interface (API).

After the data has been pre-processed, the user may adjust operating parameters of interest to provide a desired operating value indicative of the change in the current operating condition. The set of adjusted input parameters (also referred to as operating scenario, or prediction scenario) is subsequently transferred to a prediction function. This prediction function might e.g. be implemented locally in the user application or addressable via an API and carries out all operations as described above. The results are reported back to the user application e.g. in order to compare and choose between different scenarios. The user may further associate the input parameters and/or the predicted parameters with e.g. costs or other quantities that can influence the decision process regarding which operating parameters to use in the plant.

FIG. 4 visualizes an exemplary implementation concept. The raw data is automatically or manually collected at the production plant and transferred to the service provider via an API, which processes the raw data into the correct format according to the workflow e.g. as laid out above. The transformed dataset can be provided to the user, e.g. the plant operator and based on the current values, different scenarios may be defined. These scenarios can be transferred to the same or a second API running the model(s), which provides the corresponding prediction or forecast back to the user.

Short-Term Model Use Case 2

In a second use case, an expert may want to provide estimates for the development of the reactor temperature and the corresponding selectivity before the catalyst is installed at the plant. This scenario e.g. occurs frequently during the preparation of technical proposals, which provide one or more hypothetical operating scenarios and their implications to a customer, before a decision to purchase the catalyst is made. Therefore, accurate predictions for plants which have never provided data for model training are desired.

Making a few simplifying assumptions, e.g. estimating the "age" parameter totalProduction based on a hypothetical run data, usually involving constant operating parameters for the full run, substituting the temperature loss over the reactors with an estimated value based on the operating conditions, etc., the short-term model presented above can be used for this purpose given the typical set of operating parameters provided by the customer. That this can be served by the model is a direct result of the selection criteria used in the parameter selection workflow (FIG. 3), specifically to keep all parameters as inputs to the model that are typically used by operators to monitor and control their plant.

Model Presentation to User

The interface of the user application may contain a block of input parameters to the model, which may be filled automatically or manually, and which can be used to interactively specify operating scenarios; a block for model output (e.g. average reactor inlet temperature and selectivity with the prediction range) for the specified scenario; and optionally as further output a local response of the model predictions to a parameter of interest (e.g. predicted reactor inlet temperature for a range of target conversions).

The input parameter block may be filled automatically if current plant operating data are available (e.g. use case 1) or may be defined completely manually if no actual plant data is available (e.g. use case 2). Based on the user-adjusted input parameters, the parameters predicted by the model, in this example reactor inlet temperature and styrene selectivity may be displayed to the user as e.g. text (for predicting a single point), or e.g. in graphical form (local model response to variation of single parameter). These serve only as examples, as there are more ways in which such a model may be used; in terms of use cases, implementation, and presentation to a model user.

Exemplary Application: Long-Term Model

Model Development

Starting from the processed dataset that was used to develop the short-term model (Table 2), a few additional steps are taken to prepare the dataset for training the long-term model.

First, a smaller number of parameters are selected from the list, and second, each parameter is aggregated on a weekly basis.

The input parameters of the model may be constant (reactors, CatVolume), may be controlled (conversion, SOR, LHSV), can be calculated based on these constant or controlled values (totalProduction), or are not controlled in the operating scenarios of interest (temperature, selectivity, pressureOut, deltaP, deltaT, dTdev_norm).

The latter set of parameters are labelled endogenous or uncontrolled parameters, while the former (which are known throughout the forecasting range, given that the operating scenarios are carried out as planned) are labelled exogenous or controlled parameters. Table 3 provides an overview of parameters used for developing the exemplary forecast model and their assignment to both types of parameters.

TABLE 4

| parameter name | exo/endogenous | type |
| --- | --- | --- |
| reactors | exogenous | categorical |
| temperature | endogenous | numeric |
| pressureOut | endogenous | numeric |
| deltaT | endogenous | numeric |
| SOR | exogenous | numeric |
| LHSV | exogenous | numeric |
| conversion | exogenous | numeric |
| selectivity | endogenous | numeric |
| CatVolume | exogenous | numeric |
| deltaP | endogenous | numeric |
| totalProduction | exogenous | numeric |
| dTdev_norm | endogenous | numeric |

In developing the exemplary model, a number of different VARX-type candidate models as described above were trained, where the candidates differed e.g. in their regularization method (elasticnet, ridge), or their number of maximum time lags (4-10 weeks). For all of these different combinations of model, the training procedure was carried out the same way, using leave-one-out cross-validation on the plant level. All trained models are candidate models for an ensemble that finally comprises the long-term model.

While all training was performed for one-step ahead forecasts (which can, iteratively applied, forecast an arbitrary number of steps), the final selection of models should also perform well for longer forecasts. In order to evaluate this, forecasts were performed starting at multiple points of each available run in the training and test dataset, using the actual exogenous variables of those runs as operating scenarios and determine for each step ahead the error distribution for the forecasts.

Models were selected that provided no clear long-term biases and a narrow error distribution throughout the whole range (even though a moderate widening of the error distribution for longer forecasts has to be expected) for the reactor inlet temperature and the selectivity on both the training and test datasets. Model selection was based on error distributions of forecasts performed on test and training sets from 30 model candidates.

In this exemplary development of a long-term model for a styrene catalyst, the finally selected models were 3 two-stage models with a maximum time lag of 10 weeks trained on local slopes employing different types of regularization. For the ensemble forecast, all models are iteratively run independent from each other and only the complete individual forecasts are averaged to provide an ensemble prediction. In the presented example, this was a more efficient implementation compared to aggregating the forecasts after each individual step, which would be one possible alternative implementation for an ensemble prediction.

Just as with the single models, the final ensemble is evaluated on the test data to get the error distributions for N days ahead, which is in the exemplary implementation provided as error estimates of the forecasts.

As with the short-term example above, the ensemble forecast together with the expected error distribution can be viewed as a single entity of a "long-term" model for application of the model by a user, regardless of the details of the underlying procedure (ensemble averaging, multi-step models, . . . ).

Long-Term Model Use Case

In an exemplary use case, a plant operator might want to estimate the remaining catalyst lifetime depending on different scenarios of operating the plant and plant-specific limits on the operating parameters. Such scenarios may include changes to the LHSV, steam/oil-ratio or target conversion levels; there are many motivations to contemplate different scenarios, but an exemplary question would be whether the gain in catalyst lifetime running the plant at lower production levels during a phase with low prices of styrene is ultimately worth it.

The end of the catalyst lifetime may depend on many conditions defined locally at each production plant, but one limitation of catalyst lifetime is in all cases the reactor temperature or pressure which may not exceed a plant specific threshold. With predictions from the long-term model, the end of the catalyst lifetime may be estimated based on this threshold and compared for different user-defined scenarios.

Model Implementation

The model may be conceptually implemented analogous to what is described in FIG. 4, with some minor changes. The processing function, implemented e.g. locally or via an API, needs to be adapted to provide the data format used for long-term model training, in this specific example a weekly aggregation step after the procedure performed for data for the short-term model. The forecasting function, implemented e.g. locally or via an API, now not only receives a set of operating conditions to predict a single point, but instead the lagged endogenous data required by the model, as well as operating scenario values for the exogenous parameters. Similarly, the model output is the full forecast of all or only some endogenous variables of the model.

Model Presentation for User

In the implementation of a long-term model endogenous parameters used in the models need to be available for at least the last L weeks, where L is the maximum time lag used in any of the model elements comprised in the "long-term" model. This data may be automatically obtained from plant raw data as described in the data pre-processing and preparation sections, or data of appropriate format may be manually entered or uploaded.

A control parameter input block may be used by the operator to create operating scenarios over an extended period of time, e.g. in the example application the steam/oil-ratio, target conversion and LHSV can be planned ahead in up to three independent segments, to simulate also future changes. These scenarios may also be much more complex than described here. The planned operating scenarios may be visually displayed, preferably together with the history of these parameters to easier retain continuity in some of the controls. The control parameters selected for user manipulation may consist of an arbitrary subset of all exogenous parameters used in the model. In this specific implementation, the other 3 exogenous parameters are either constant, or can directly be derived from the other inputs and/or time.

The forecasts provided by the long-term model may be displayed in table format, ready for export of the data and e.g. further analysis based on the forecasted trends, or the results may be graphically displayed to the user for a visual inspection of one or more different planned scenarios.

The interface may contain a section, where selected control (exogenous) parameters can be defined for user-defined operating scenarios (e.g. target conversion, LHSV and steam/oil-ratio; plots representing the actual data up to the start of prediction and for the operating scenarios going forward). In another section of the interface, selected endogenous parameters may be presented to the user (e.g. reactor inlet temperature and styrene selectivity; the start of the prediction may be marked by a horizontal dashed line, beyond that point everything is forecasted by the model and includes estimates of the forecast error). In addition, the predictions of all or some endogenous parameters may be presented as a data frame which can be exported by the user.

The invention claimed is:

1. A system for providing a recommended operating condition of a chemical production plant, the system comprising a communication interface and a processing device in communication with the communication interface,
    (a) for a scheduled production run, the system is configured to:
        receive, via the communication interface, operating data indicative of a pre-defined operating condition for the scheduled production run,
        receive, via the communication interface, a catalyst age indicator associated with a period of time the catalyst has been used in the scheduled production run,
        select, via the processing device, at least one recommended target operating parameter for the operating condition of the scheduled production run based on the operating data and the catalyst age indicator using a data-driven model, wherein the data-driven model is parameterized according to a training dataset, wherein the training dataset is based on sets of historical data comprising operating data, catalyst age indicator, and the at least one recommended target operating parameter, wherein the recommended target operating parameter comprises adjusting one or more operating conditions selected from the maximum reaction temperature, minimum selectivity, minimal or maximal production volume per day, inlet temperatures, steam-to-oil ratio, inlet or outlet pressures, flow rate, number of reactors used, conversion, space velocity, and selectivity,
        provide, via the communication interface, the at least one recommended target operating parameter for the operating condition of the scheduled production run, or
    (b) for a change in a current production run, the system is configured to:
        receive, via the communication interface, measured operating data indicative of a current operating condition for the current production run, wherein at least one operating data point includes a desired operating value indicative of the change in the current operating condition,
        receive, via the communication interface, a catalyst age indicator associated with a period of time the catalyst has been used in the current production run,
        select, via the processing device, at least one recommended target operating parameter for the operating condition of the change in the current production run based on the operating data and the catalyst age indicator using a data-driven model, wherein the data-driven model is parameterized according to a training dataset, wherein the training dataset is based on sets of historical data comprising operating data, catalyst age indicator, and the at least one recommended target operating parameter,
        provide, via the communication interface, the at least one recommended target operating parameter for the operating condition of the change in the current production run.

2. The system of claim 1, wherein the operating data includes sensor data measured through sensors installed in the chemical production plant, quantities directly or indirectly derived from such sensor data, analytical data measured in samples taken from the chemical production plant, and/or quantities directly or indirectly derived from such analytical data.

3. The system of claim 1, wherein the system is configured to
    receive, via the communication interface, plant metadata indicative of a physical plant layout, and
    select, via the processing device, at least one recommended target operating parameter additionally based on the plant metadata using a data-driven model, wherein the training dataset is based on sets of historical data additionally comprising plant meta data.

4. The system of claim 3, wherein the system is further configured to pre-process, via the processing device, the operating data and the plant metadata prior to selection of the at least one recommended target operating parameter, wherein the pre-processing includes a transformation to quantities independent of the physical plant layout.

5. The system of claim 1, wherein the sets of historical data include data from multiple runs, multiple plants and/or multiple catalyst batches.

6. The system of claim 1, wherein the catalyst age indicator is based on a point in time, a time period, a quantity derived from time dependent operating data and/or a quantity cumulatively derived from time dependent operating data.

7. The system of claim 1, wherein the system is configured to select, via the processing device, at least one recommended target operating parameter based on a short-term model selecting recommended target operating parameters for discrete points in time or a long-term model selecting recommended target operating parameters for a period of time.

8. The system of claim 1, wherein the system is configured to receive, via the communication interface, a time series of the at least one recommended target operating parameter as measured, predicted or derived during the current or a previous production run up to a prediction point in time, wherein the system is further configured to select, via the processing device, at least one recommended target operating parameter for one or more points in time following the prediction point in time based on the operating data, the time series of the at least one recommended target operating parameter, the catalyst age indicator and optionally the plant meta data using the data-driven model, wherein the data-driven model includes an intrinsic time-dependence.

9. A system for optimizing an operating condition of a chemical production plant, the system comprising:
the system according to claim 1 and an optimization processing device in communication with the communication interface, the optimization processing device configured to:
receive, via the communication interface, for more than one operating condition as selected either (a) for scheduled production runs or (b) for changes in a current production run, the selected recommended target operating parameter(s),
select, via the optimization processing device, based on the received recommended target operating parameter(s) for each operating condition a minimum or maximum value of a recommended target operating parameter or a minimum or maximum value of an optimization parameter derived from the recommended target operating parameter(s),
provide, via the communication interface, the minimum or maximum value indicative of an optimal operating condition in either (a) the scheduled production run or (b) the current production run.

10. A production monitoring and/or control system including a communication interface communicatively coupled to the system for selecting the operating condition according to claim 1.

11. The production monitoring and/or control system of claim 10 including a display device, which is configured to receive and display the selected operating condition or including a control device, which is configured to receive the selected operating condition and to control the current or scheduled production run in the chemical production plant based on the selected operating condition.

12. A computer-implemented method for selecting a recommended operating condition of a chemical production plant including at least one catalytic reactor, the method comprising the steps:
(a) for a scheduled production run, the method comprising the steps:
receive, via a communication interface, operating data indicative of a pre-defined operating condition for the scheduled production run,
receive, via the communication interface, a catalyst age indicator associated with a period of time the catalyst has been used in the scheduled production run,
select, via the processing device, at least one recommended target operating parameter for the operating condition of the scheduled production run based on the operating data and the catalyst age indicator using a data-driven model, wherein the data-driven model is parameterized according to a training dataset, wherein the training dataset is based on sets of historical data comprising operating data, catalyst age indicator, and the at least one recommended target operating parameter, wherein the recommended target operating parameter comprises adjusting one or more operating conditions selected from the maximum reaction temperature, minimum selectivity, minimal or maximal production volume per day, inlet temperatures, steam-to-oil ratio, inlet or outlet pressures, flow rate, number of reactors used, conversion, space velocity, and selectivity,
provide, via the communication interface, the at least one recommended target operating parameter for the operating condition of the scheduled production run, or
(b) for a change in a current production run, the method comprising the steps:
receive, via the communication interface, measured operating data indicative of a current operating condition for the current production run, wherein at least one operating data point includes a desired operating value indicative of the change in the current operating condition,
receive, via the communication interface, a catalyst age indicator associated with a period of time the catalyst has been used in the current production run,
select, via the processing device, at least one recommended target operating parameter for the operating condition of the change in the current production run based on the operating data and the catalyst age indicator using a data-driven model, wherein the data-driven model is parameterized according to a training dataset, wherein the training dataset is based on sets of historical data comprising operating data, catalyst age indicator, and the at least one recommended target operating parameter, wherein the recommended target operating parameter comprises adjusting one or more operating conditions selected from the maximum reaction temperature, minimum selectivity, minimal or maximal production volume per day, inlet temperatures, steam-to-oil ratio, inlet or outlet pressures, flow rate, number of reactors used, conversion, space velocity, and selectivity,
provide, via the communication interface, the at least one recommended target operating parameter for the operating condition of the change in the current production run.

13. The method of claim 12, further comprising the step of
receiving, via the communication interface, plant metadata indicative of a physical plant layout, and
selecting, via the processing unit, at least one recommended target operating parameter is additionally based on the plant metadata using a data-driven model, wherein the training dataset is based on sets of historical data additionally comprising plant meta data.

14. The method of claim 13, further comprising the step of pre-process (12), via the processing device, the operating data and the plant meta data prior to selection of the at least one recommended target operating parameter, wherein the pre-processing includes a transformation to quantities independent of the physical plant layout.

15. The method of claim 12, wherein the sets of historical data include data from multiple runs, multiple plants and/or multiple catalyst batches.

16. The method of claim 12, wherein the selection of at least one recommended target operating parameter is based on a short-term model selecting recommended target operating parameters for discrete points in time or a long-term model selecting recommended target operating parameters for a period of time.

17. The method of claim 12, wherein a time series of the at least one recommended target operating parameter as measured, predicted or derived during the current or a previous production run up to a prediction point in time is received (10) via the communication interface, wherein at least one recommended target operating parameter for one or more points in time following the prediction point in time based on the operating data, the time series of the at least one recommended target operating parameter, the catalyst age indicator and optionally the plant meta data using the data-driven model is selected, via the processing unit, wherein the data-driven model includes an intrinsic time-dependence.

18. A method for optimizing an operating condition of a scheduled production run or of a change in a current production run of a chemical production plant, the method comprising the steps of:

receive, via a communication interface, for more than one operating condition as selected either (a) for scheduled production runs or (b) for changes in a current production run, the selected recommended target operating parameter(s), select, via the optimization processing device, based on the received recommended target operating parameter(s) for each operating condition a minimum or maximum value of a recommended target operating parameter or a minimum or maximum value of an optimization parameter derived from the recommended target operating parameter(s), wherein the recommended target operating parameter comprises adjusting one or more operating conditions selected from the maximum reaction temperature, minimum selectivity, minimal or maximal production volume per day, inlet temperatures, steam-to-oil ratio, inlet or outlet pressures, flow rate, number of reactors used, conversion, space velocity, and selectivity, provide, via the communication interface, the minimum or maximum value indicative of an optimal operating condition in either (a) the scheduled production run or (b) the current production run.

19. A method for monitoring and/or controlling a chemical production plant, which includes the steps of performing the method for selecting a recommended operating condition according to claim 12.

20. A computer program or computer readable non-volatile storage medium comprising computer readable instructions, which when loaded and executed by a processing device perform the methods of claim 12.

21. The system of claim 1, wherein the catalyst is a dehydrogenation catalyst.

* * * * *